(12) United States Patent
Ono et al.

(10) Patent No.: US 11,865,576 B2
(45) Date of Patent: Jan. 9, 2024

(54) LAYERED BODY

(71) Applicant: KANSAI PAINT CO., LTD., Hyogo (JP)

(72) Inventors: Ikumi Ono, Kanagawa (JP); Nobuhiko Narita, Kanagawa (JP); Hirokazu Okazaki, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 868 days.

(21) Appl. No.: 16/772,265

(22) PCT Filed: Dec. 14, 2018

(86) PCT No.: PCT/JP2018/046032
§ 371 (c)(1),
(2) Date: Jun. 12, 2020

(87) PCT Pub. No.: WO2019/117280
PCT Pub. Date: Jun. 20, 2019

(65) Prior Publication Data
US 2021/0086228 A1 Mar. 25, 2021

(30) Foreign Application Priority Data

Dec. 15, 2017 (JP) ................................. 2017-240877

(51) Int. Cl.
*B05D 5/06* (2006.01)
*B05D 1/04* (2006.01)
(Continued)

(52) U.S. Cl.
CPC ............. *B05D 5/068* (2013.01); *B05D 1/045* (2013.01); *B05D 7/576* (2013.01); *B05D 7/584* (2013.01); *C09D 5/38* (2013.01)

(58) Field of Classification Search
None
See application file for complete search history.

(56) References Cited

U.S. PATENT DOCUMENTS

2005/0208292 A1* 9/2005 Kuramochi ............. B05D 7/57
428/328
2015/0202655 A1* 7/2015 Nakano ................. B05D 7/572
428/457
(Continued)

FOREIGN PATENT DOCUMENTS

CA 2 934 929 7/2015
CA 2 965 103 4/2016
(Continued)

OTHER PUBLICATIONS

Masuda—JP 2004-271467 A—Euro D2-MT—method evaluate paint color—2004 (Year: 2004).*
(Continued)

*Primary Examiner* — John Vincent Lawler
(74) *Attorney, Agent, or Firm* — Wenderoth, Lind & Ponack, L.L.P.

(57) ABSTRACT

A laminate containing a metallic base layer and a transparent colored layer formed on the metallic base layer, wherein, when $$X=[(C^*45)^2+(C^*75)^2)]^{1/2}, \text{ and}$$

$$Y=[(L^*15)^2+(C^*15)^2)]^{1/2}+[(L^*25)^2+(C^*25)^2)]^{1/2},$$

X is 64 or more, and Y is 191 or more; and the measured value of graininess (HG value) is 45 or less, with the proviso that C*15, C*25, C*45, and C*75 represent chroma calculated from spectral reflectances of light illuminated at an incident angle of 45 degrees with respect to the laminate and received at respective angles of 15 degrees, 25 degrees, 45 degrees, and 75 degrees deviated from the specular reflection light, and that L*15 and L*25 represent lightness calculated from spectral reflectances of light illuminated at an incident angle of 45 degrees with respect to the
(Continued)

laminate and received at respective angles of 15 degrees and 25 degrees deviated from the specular reflection light.

5 Claims, 1 Drawing Sheet

(51) Int. Cl.
*B05D 7/00* (2006.01)
*C09D 5/38* (2006.01)

(56) References Cited

U.S. PATENT DOCUMENTS

| | | | |
|---|---|---|---|
| 2016/0354805 A1* | 12/2016 | Fujiwara | B05D 7/572 |
| 2019/0001370 A1 | 1/2019 | Itoh et al. | |
| 2019/0085182 A1* | 3/2019 | Goedhart | B05D 5/068 |

FOREIGN PATENT DOCUMENTS

| | | | | |
|---|---|---|---|---|
| CA | 2965103 A1 | * | 4/2016 | B05D 1/007 |
| CA | 3 024 207 | | 11/2017 | |
| JP | 2003/145673 A | * | 5/2003 | B32B 15/08 |
| JP | 2004/271467 | * | 9/2004 | B05D 3/00 |
| JP | 2004-271467 | | 9/2004 | |
| JP | 2005-169385 | | 6/2005 | |
| JP | 2008/110513 | * | 5/2008 | B05D 1/007 |
| JP | 2008-110513 | | 5/2008 | |
| JP | 2011-20021 | | 2/2011 | |
| JP | 2011-136317 | | 7/2011 | |
| JP | 2014-42892 | | 3/2014 | |
| WO | 2017/135426 | | 8/2017 | |

OTHER PUBLICATIONS

Suzuki—JP 2008-110513A—Euro D3-MT—metal sheet decorative—2008 (Year: 2008).*
Ito—JP 2003-145673 A-MT—metallic tone decorative laminate w-thin metal sputter layer—2003 (Year: 2003).*
Office Action dated Dec. 31, 2021 in corresponding Canadian Patent Application No. 3,085,701.
Office Action dated Jul. 16, 2021 in corresponding Canadian Patent Application No. 3,085,701.
International Search Report (ISR) dated Jan. 29, 2019 in International (PCT) Application No. PCT/JP2018/046032.
Extended European Search Report dated Aug. 25, 2021 in corresponding Patent Application No. 18888927.3.

* cited by examiner

LAYERED BODY

TECHNICAL FIELD

The present invention relates to a laminate comprising a metallic base layer, and a transparent colored layer formed on the metallic base layer.

BACKGROUND ART

Sophisticated designs for articles such as automobiles have been demanded.

For example, PTL 1 discloses a coating method for forming a multilayer coating film that has a metallic coating color with dense graininess and metal feeling, as well as high chroma and high darkness of color. The method includes applying an effect pigment-containing metallic base paint (A) to the surface of a substrate, and then applying a clear colored paint (B); wherein the metallic base paint (A) has an IV value of 230 or more, and the graininess measured (HG value) of the formed coating film is 60 or less.

CITATION LIST

Patent Literature

PTL 1: JP2005-169385A

SUMMARY OF INVENTION

Technical Problem

In PTL 1, the luster is merely determined by measuring the IV value of the entire coating film of the metallic paint. PTL 1 evaluates the chroma of the coating film based on the C value measured with an MA68-2 multi-angle spectrophotomreter (produced by X-Rite Inc.) at an receiving angle of 25 degrees given by a specular reflection axis and an acceptance light axis, when the coating film is irradiated with light at an incident angle of 45 degrees, as well as based on visual observation; and also evaluates the darkness of color of the coating film by visually observing the change in lightness from the highlight to the bottom.

A great change in lightness from the highlight to the bottom along with darkness of color of a coating film makes the film appears more three-dimensional, but also makes the color look darker. PTL 1 does not focus on maintaining a high chroma of a coating film within the range from the highlight to the bottom.

An object of the present invention is to provide a laminate that has high lightness in the highlight and high chroma over a wide range from the highlight to the bottom.

Solution to Problem

The present invention includes the following items.
Item 1. A laminate comprising a metallic base layer and a transparent colored layer formed on the metallic base layer, wherein, when $X=[(C*45)^2+(C*75)^2]^{1/2}$, and $Y=[(L*15)^2+(C*15)^2]^{1/2}+[(L*25)^2+(C*25)^2]^{1/2}$, X is 64 or more, and Y is 191 or more; and
the measured value of graininess (HG value) is 45 or less, with the proviso that C*15, C*25, C*45, and C*75 represent chroma calculated from spectral reflectances of light illuminated at an incident angle of 45 degrees with respect to the laminate and received at respective angles of 15 degrees, 25 degrees, 45 degrees, and 75 degrees deviated from the specular reflection light, and that L*15 and L*25 represent lightness calculated from spectral reflectances of light illuminated at an incident angle of 45 degrees with respect to the laminate and received at respective angles of 15 degrees and 25 degrees deviated from the specular reflection light.

Item 2. The laminate according to Item 1, wherein X is 65 or more and 80 or less, and Y is 200 or more and 240 or less.
Item 3. The laminate according to Item 1 or 2, wherein the metallic base layer comprises an aluminum pigment in an amount of 15 to 70 parts by mass, on a solids basis, based on 100 parts by mass of the metallic base layer.
Item 4. The laminate according to any one of Items 1 to 3, further comprising a clear coat layer on the transparent colored layer.
Item 5. An object comprising the laminate according to any one of Items 1 to 4.

Advantageous Effects of Invention

The present invention provides a laminate having high lightness in the highlight, and high chroma over a wide range from the highlight to the bottom. Such a laminate can impart a vivid and bright appearance with excellent attractiveness to an object to which the laminate is applied.

BRIEF DESCRIPTION OF DRAWINGS

In FIG. 2, "E" denotes "Example," and "C" denotes "Comparative Example."

DESCRIPTION OF EMBODIMENTS

The laminate of the present invention comprises a metallic base layer and a transparent colored layer formed on the metallic base layer,
wherein, when $X=[(C*45)^2+(C*75)^2]^{1/2}$ (Equation 1), and $Y=[(L*15)^2+(C*15)^2]^{1/2}+[(L*25)^2+(C*25)^2]^{1/2}$ (Equation 2), X is 64 or more, and Y is 191 or more; and
the measured value of graininess (HG value) is 45 or less.
  L* and C* respectively indicate lightness and chroma in the L*a*b* color space, which was standardized in 1976 by the Commission Internationale de l'Eclaiage, and also adopted in JIS Z 8729.
  C*15, C*25, C*45, and C*75 are respectively defined as numerical values of chroma calculated from the spectral reflectances of light illuminated at an angle of 45 degrees with respect to the obtained coating film and received at angles of 15 degrees, 25 degrees, 45 degrees, and 75 degrees deviated from the specular reflection light, using a multi-angle spectrophotometer (produced by X-Rite Inc., trade name: MA-68II).
  L*15 and L*25 are respectively defined as numerical values of lightness calculated from the spectral reflectances of light illuminated at an angle of 45 degrees with respect to the obtained coating film and received at angles of 15 degrees and 25 degrees deviated from the specular reflection light, using a multi-angle spectrophotometer (produced by X-Rite Inc., trade name: MA-68II).

It is preferred that $C^{*}15$ be 100 or more, $C^{*}25$ be 75 or more, $C^{*}45$ be 50 or more, and $C^{*}75$ be 35 or more, because the color of the laminate can be kept vivid and bright over a wide range from the highlight to the bottom as a whole.

The term "highlight" means observing the laminate near the specular reflection light. The term "bottom" means observing the laminate at an angle that is unaffected by the specular reflection light. The "face" means observing the laminate from an angle between the highlight and the bottom.

Figure 1:
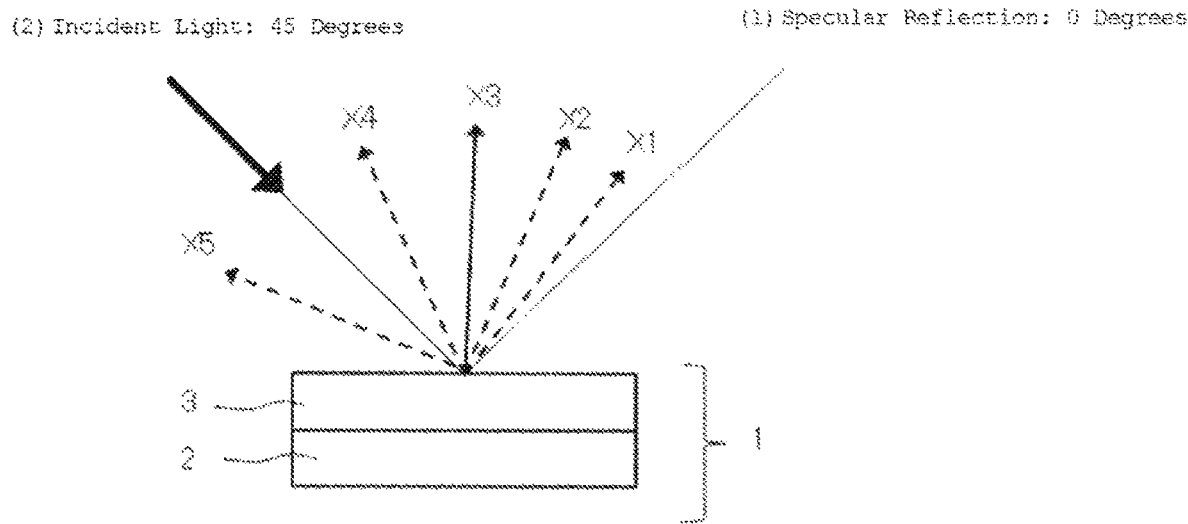
FIG. 1 illustrates the structure of a coating film and a luster distribution due to changes in angle.

As shown in FIG. 1, in the present application, the spectral reflectances at receiving angles of 15 degrees (X1), 25 degrees (X2), 45 degrees (X3), 75 degrees (X4), and 110 degrees (X5) deviated from the specular reflection light were measured using a multi-angle spectrophotometer (produced by X-Rite Inc., trade name: MA-68II) in order to accurately determine the optical properties of a laminate 1 in the angle range from the highlight at an angle of 10 degrees deviated from the specular reflection light (1) to the bottom at an angle of 110 degrees deviated from the specular reflection light from fewer measured reflectances. Among these, there was little difference between the chroma values at 110 degrees and 75 degrees. Thus, for chroma, the spectral reflectance measurement values at four angles, i.e., 15 degrees (X1), 25 degrees (X2), 45 degrees (X3), and 75 degrees (X4) from the highlight to the face were used. For lightness, the spectral reflectance measurement values at two angles, i.e., 15 degrees (X1) and 25 degrees (X2) in the highlight were used. FIG. 1 illustrates the laminate 1 comprising a metallic base layer 2 and a transparent colored layer 3 formed on the metallic base layer 2.

X in Equation 1 is an index of chroma in which chroma $C^{*}45$ in the face (45 degrees) and chroma $C^{*}75$ in the bottom (75 degrees) are expressed as variables. A large value of X indicates that the chroma is high, irrespective of the angle change in the face and the bottom. X can be a measure of chroma of the laminate in the face and bottom perceived by an observer viewing the laminate.

When X is less than 64, the color of the laminate is observed as being dark because of a large decrease in chroma in the range from the face to the bottom.

Y in Equation 2 is an index of chroma and lightness in which chroma $C^{*}15$ at 15 degrees, chroma $C^{*}25$ at 25 degrees, lightness $L^{*}15$ at 15 degrees, and lightness $L^{*}25$ at 25 degrees are expressed as variables. 15 degrees and 25 degrees are angles at which the reflectance changes abruptly in the highlight. Y can be a measure of a combination of chroma and lightness of the laminate in the highlight perceived by an observer viewing the laminate.

When Y is less than 191, the chroma and the lightness of the laminate in the highlight are poor.

When X is 64 or more, and Y is 191 or more, a laminate having high lightness in the highlight, and high chroma over a wide range from the highlight to the bottom, can be obtained.

When X is 65 or more and 80 or less, and Y is 200 or more and 240 or less, a laminate having high lightness in the highlight, and higher chroma over a wide range from the highlight to the bottom, can be obtained.

The graininess is expressed as a hi-light graininess value (hereinafter abbreviated as the "HG value"). The HG value is a parameter of microscopic brilliance obtained by microscopic observation, and indicates the graininess in the highlight (observation of the laminate from near the specular reflection light against incident light). The HG value is a measured value calculated as follows. First, the coating film of the laminate is photographed with a CCD camera at an incident angle of 15 degrees and a receiving angle of 0 degrees, and the obtained digital image data (i.e., two-dimensional luminance distribution data) is subjected to a two-dimensional Fourier transform to obtain a power spectrum image. Subsequently, only the spatial frequency domain corresponding to graininess is extracted from the power spectrum image, and the obtained measurement parameter is converted to an HG value from 0 to 100 that has a linear relation with graininess. An HG value of "0" indicates no graininess, and an HG value of almost "100" indicates the highest possible graininess.

The laminate of the present invention has an HG value of 45 or less. Thus, a laminate having low graininess and exhibiting a color with a delicate impression can be obtained. When the HG value exceeds 45, a laminate exhibiting a color with a delicate impression cannot be obtained; therefore, such an HG value exceeding 45 is not preferable.

The laminate of the present invention may be a laminated coating film in which a plurality of coating films are laminated, a laminated film in which a plurality of films are laminated, or a laminate comprising both one or more coating films and one or more films.

Configuration of Each Layer of Laminate

Next, the configuration of each layer of the laminate of the present invention is described. The configuration of each coating film when the laminate is embodied as a multilayer coating film is described below; however, each layer may be configured in the form of a film.

Metallic Base Layer

The metallic base layer comprises an aluminum pigment, a light-scattering component, a surface adjusting agent, and a rheology control agent.

Preferably, the metallic base layer comprises an aluminum pigment, a light-scattering component, a surface adjusting agent, and a rheology control agent, the aluminum pigment being present in an amount of 15 to 70 parts by mass, on a solids basis; and the light-scattering component being present in an amount of 5 to 55 parts by mass, on a solids basis, based on 100 parts by mass of the metallic base layer.

With this configuration, a laminate having high lightness in the highlight and higher chroma over a wide range from the highlight to the bottom can be obtained.

The metallic base coating film as the metallic base layer is formed by applying a metallic base paint composition (A), and preferably drying the composition. The metallic base coating film preferably has a dry film thickness of about 0.02 to 5 µm, more preferably about 0.02 to 4 µm, and even more preferably about 0.02 to 3.5 µm. A dry film thickness of 0.02 µm or more is advantageous in terms of masking the undercoating sufficiently. A dry film thickness of 5.0 µm or less is advantageous in terms of coating operation because popping, sagging, and the like are less likely to occur.

The metallic base paint composition (A) comprises water as a main solvent; and comprises an aluminum pigment, a light-scattering component, a surface adjusting agent, and a rheology control agent.

The aluminum pigment is a flake pigment containing aluminum and is used to mask the undercoating layer under the metallic base coating film and obtain a coating film with excellent metallic luster. Examples of the aluminum pigment include aluminum flake pigments and vapor-deposition aluminum flake pigments.

The aluminum flake pigment is a flake pigment containing aluminum as a base material. The aluminum flake pigment is desirably treated to inhibit reaction with water; in particular, the surface of the aluminum flake pigment is preferably treated with silica, in terms of the storage stability of the paint, and high lightness near the highlight and high chroma over a wide range from the highlight to the bottom in the multilayer coating film to be obtained.

The average thickness of the aluminum flake pigment is preferably 0.03 to 2 µm, and more preferably 0.05 to 1 µm.

The average particle size (D50) of the aluminum flake pigment is preferably about 1 to 50 µm, and more preferably about 5 to 20 W. This is preferable in terms of, for example, the storage stability of the paint, and the excellent metallic luster of the coating film to be obtained. The above-mentioned average particle size means a major axis.

The vapor-deposition aluminum flake pigment is obtained by vapor-depositing an aluminum film on a base material, removing the base material, and then grinding the vapor-deposition aluminum film. Examples of the base material include films and the like.

Examples of commercial products that can be used as the vapor-deposition aluminum flake pigment include "Metalure" series (trade name, produced by ECKART), "Hydroshine WS" series (trade name, produced by ECKART), "Decomet" series (trade name, produced by Schlenk), "Metasheen" series (trade name, produced by BASF), and the like.

The average thickness of the vapor-deposition aluminum flake pigment is preferably 0.005 to 1 µm, and more preferably 0.01 to 0.1 µm.

The average particle size (050) of the vapor-deposition aluminum flake pigment is preferably 1 to 50 µm, and more preferably 5 to 20 µm. This is preferable in terms of storage stability, and high lightness near the highlight and high chroma over a wide range from the highlight to the bottom in the multilayer coating film to be obtained. The above-mentioned average particle size means a major axis.

The surface of the vapor-deposition aluminum flake pigment is preferably treated with silica, in terms of obtaining a multilayer coating film having storage stability.

As the aluminum pigment, either an aluminum flake pigment or a vapor-deposition aluminum flake pigment, or both, may be used.

The total aluminum pigment content in the metallic base paint composition (A) is preferably 0.2 to 6 parts by mass, more preferably 0.3 to 5 parts by mass, and even more preferably 0.5 to 4.5 parts by mass, on a solids basis, based on 100 parts by mass of the metallic base paint composition, in terms of high lightness near the highlight and high chroma over a wide range from the highlight to the bottom in the multilayer coating film to be obtained.

In the present specification, the solids content refers to a nonvolatile content, and means a residue obtained by removing volatile components such as water and an organic solvent from a sample. The solids content can be calculated by multiplying the mass of a sample by the solids concentration. The solids concentration can be measured by dividing the mass of a residue obtained by drying 3 grams of a sample at 105° C. for 3 hours by the mass before drying.

The light-scattering component is used for high lightness near the highlight and high chroma over a wide range from the highlight to the bottom in the multilayer coating film.

The content of the light-scattering component in the metallic base paint composition (A) is preferably 0.1 to 10 parts by mass, and more preferably 0.5 to 8 parts by mass, on a solids basis, based on 100 parts by mass of the metallic base paint composition forming the metallic base layer, in terms of high lightness near the highlight and high chroma over a wide range from the highlight to the bottom in the multilayer coating film to be obtained. Moreover, the content of the light-scattering component in the metallic base paint composition (A) is 30 to 90 parts by mass, preferably 33 to 85 parts by mass, and more preferably 35 to 80 parts by mass, on a solids basis, based on 100 parts by mass of the total solids content in the metallic base paint composition (A), in terms of high lightness near the highlight and high chroma over a wide range from the highlight to the bottom in the multilayer coating film to be obtained.

Examples of the light-scattering component include white pigments, interference pigments, and combinations thereof; and the like. Examples of white pigments include titanium oxide, zinc oxide, and the like. The white pigments may be used singly, or in a combination of two or more.

When a white pigment is used as the light-scattering component, the white pigment content in the metallic base paint composition (A) is preferably 0.1 to 10 parts by mass, more preferably 0.5 to 8 parts by mass, and even more preferably 0.5 to 5 parts by mass, on a solids basis, based on 100 parts by mass of the metallic base paint composition (A), in terms of high lightness near the highlight and high chroma over a wide range from the highlight to the bottom in the multilayer coating film to be obtained.

Interference pigments are effect pigments obtained by coating the surface of transparent or translucent flaky base materials, such as natural mica, synthetic mica, glass, iron oxide, aluminum oxide, and various metal oxides, excluding white pigments, with metal oxides having refractive indices that are different from those of the base materials. The interference pigments may be used singly, or in a combination of two or more.

Natural mica is a flaky base material obtained by pulverizing mica from ore. Synthetic mica is synthesized by heating an industrial material, such as $SiO_2$, $MgO$, $Al_2O_3$, $K_2SiF_6$, or $Na_2SiF_6$, to melt the material at a high temperature of about 1500° C.; and cooling the melt for crystallization. When compared with natural mica, synthetic mica contains a smaller amount of impurities, and has a more uniform size and thickness. Specific examples of synthetic mica base materials include fluorophlogopite ($KMg_3AlSi_3O_{10}F_2$), potassium tetrasilicon mica ($KMg_{2.5}AlSi_4O_{10}F_2$), sodium tetrasilicon mica ($NaMg_{2.5}AlSi_4O_{10}F_2$), Na taeniolite ($NaMg_2LiSi_4O_{10}F_2$), LiNa taeniolite ($LiMg_2LiSi_4O_{10}F_2$), and the like.

Examples of metal oxides include titanium oxide, iron oxide, and the like. Interference pigments can develop various different interference colors depending on the difference in the thickness of the metal oxide.

Specific examples of interference pigments include metal oxide-coated mica pigments, metal oxide-coated alumina flake pigments, metal oxide-coated glass flake pigments, metal oxide-coated silica flake pigments, and the like, described below.

Metal oxide-coated mica pigments are pigments obtained by coating the surface of a natural mica or synthetic mica base material with a metal oxide.

Metal oxide-coated alumina flake pigments are pigments obtained by coating the surface of an alumina flake base material with a metal oxide. Alumina flakes refer to flaky (thin) aluminum oxides, which are clear and colorless. Alumina flakes do not necessarily consist of only aluminum oxide, and may contain other metal oxides.

Metal oxide-coated glass flake pigments are pigments obtained by coating the surface of a flaky glass base material with a metal oxide. The metal oxide-coated glass flake pigments have a smooth base material surface, which causes intense light reflection.

Metal oxide-coated silica flake pigments are pigments obtained by coating flaky silica, a base material having a smooth surface and a uniform thickness, with a metal oxide.

Among the interference pigments, those obtained by coating the surface of a base material such as a natural mica, synthetic mica, silicon dioxide, or aluminum oxide with a metal oxide, such as titanium oxide or iron oxide, are preferable in order to increase the lightness from the face to the bottom in the coating film, as well as the lightness in the highlight. Such pigments are called pearl pigments because they have a pearly texture, and transparency. Examples of pearl pigments include white pearl pigments that are obtained by coating the surface of a natural or synthetic mica base material with titanium oxide, and that exhibit white color due to reflection of multiple reflection light; interference pearl pigments that are obtained by coating the surface of a natural or synthetic mica base material with titanium oxide, and that develop a color due to interference of multiple reflection light; color pearl pigments that are obtained by coating the surface of a natural or synthetic mica base material with iron oxide; and the like.

The above interference pigments may be subjected to surface treatment in order to improve dispersibility, water resistance, chemical resistance, weather resistance, or the like.

The average particle size of the interference pigment is preferably 5 to 30 μm, and particularly preferably 7 to 20 μm, in terms of high lightness near the highlight and high chroma over a wide range from the highlight to the bottom in the multilayer coating film to be obtained. The particle size as used herein refers to the median size of a volume-based particle size distribution measured by a laser diffraction scattering method using a Microtrac MT3300 particle size distribution analyzer (trade name, produced by Nikkiso Co., Ltd.).

The thickness of the interference pigment is preferably 0.05 to 1 μm, and particularly preferably 0.1 to 0.8 μm, in terms of high lightness near the highlight and high chroma over a wide range from the highlight to the bottom in the multilayer coating film to be obtained. The thickness as used herein is obtained in such a manner that when a cross-section of a coating film containing an interference pigment is observed with an optical microscope, the minor axis of the interference pigment particles is measured using image-processing software, and the average of the measured values of 100 or more particles is defined as the thickness.

When an interference pigment is used as the light-scattering component, the interference pigment content in the metallic base paint composition (A) is preferably 0.1 to 10 parts by mass, and more preferably 0.5 to 8 parts by mass, on a solids basis, based on 100 parts by mass of the metallic base paint composition (A), in terms of high lightness near the highlight and high chroma over a wide range from the highlight to the bottom in the multilayer coating film to be obtained.

The light-scattering component is preferably combined with at least one of an aluminum flake pigment and a vapor-deposition aluminum flake pigment, more preferably combined with an aluminum flake pigment, in terms of obtaining a multilayer coating film having high lightness near the highlight and high chroma over a wide range from the highlight to the bottom. When the light-scattering component is combined with at least one of an aluminum flake pigment and a vapor-deposition aluminum flake pigment, it is preferred that the amount of the light-scattering component be 5 to 250 parts by mass, and preferably 10 to 150 parts by mass, on a solids basis, based on 100 parts by mass of the solids content of the aluminum pigment.

When the light-scattering component is combined with at least one of an aluminum flake pigment and a vapor-deposition aluminum flake pigment, the amount of the at least one of an aluminum flake pigment and a vapor-deposition aluminum flake pigment is preferably 0.2 to 6 parts by mass, and more preferably 0.2 to 5 parts by mass, on a solids basis, based on 100 parts by mass of the metallic base paint composition; and the amount of the light-scattering component is preferably 0.1 to 10 parts by mass, and more preferably 0.5 to 8 parts by mass, on a solids basis, based on 100 parts by mass of the metallic base paint composition.

In one preferred embodiment, the aluminum pigment is a vapor-deposition aluminum flake pigment, and the light-scattering component is a white pigment. It is preferred that the amount of the vapor-deposition aluminum flake pigment be 0.2 to 6 parts by mass, on a solids basis; and the amount of the white pigment be 0.1 to 10 parts by mass, on a solids basis, based on 100 parts by mass of the metallic base paint composition. It is more preferred that the amount of the vapor-deposition aluminum flake pigment be 0.5 to 3 parts by mass, on a solids basis; and the amount of the white pigment be 0.2 to 5 parts by mass, on a solids basis, based on 100 parts by mass of the metallic base paint composition. With this configuration, a multilayer coating film having higher lightness near the highlight and high chroma over a wide range from the highlight to the bottom can be obtained.

In another preferred embodiment, the aluminum pigment is an aluminum flake pigment whose surface is treated with silica; and the light-scattering component is a titanium oxide-coated mica pigment, a white pigment, a titanium oxide-coated alumina flake pigment, or a combination thereof. It is preferred that the amount of the aluminum flake pigment be 0.2 to 6 parts by mass, on a solids basis; and the amount of the light-scattering component be 0.1 to 10 parts by mass, on a solids basis, based on 100 parts by mass of the metallic base paint composition. It is more preferred that the amount of the aluminum flake pigment be 0.5 to 5 parts by mass, on a solids basis; and the amount of the light-scattering component be 0.2 to 10 parts by mass, on a solids basis, based on 100 parts by mass of the metallic base paint composition. With this configuration, a multilayer coating film having higher lightness near the highlight and high chroma over a wide range from the highlight to the bottom can be obtained.

The surface adjusting agent is used to facilitate uniform orientation of the above aluminum pigment dispersed in water on an object when the metallic base paint composition (A) is applied to the object.

As the surface adjusting agent, a known surface adjusting agent can be used.

Examples of the surface adjusting agent include silicone-based surface adjusting agents, acrylic-based surface adjusting agents, vinyl-based surface adjusting agents, fluorine-based surface adjusting agents, acetylenediol-based surface adjusting agents, and like surface adjusting agents. These surface adjusting agents may be used singly, or in a combination of two or more.

Examples of commercial products of the surface adjusting agent include BYK series (produced by BYK-Chemie), Tego series (produced by Evonik), Glanol series and Polyflow series (produced by Kyoeisha Chemical Co., Ltd.), Disparlon series (produced by Kusumoto Chemicals, Ltd.), Surfynol (registered trademark) series (produced by Evonik Industries), and the like.

Usable silicone-based surface adjusting agents include polydimethylsiloxane and modified silicone obtained by modifying polydimethylsiloxane. Examples of modified silicone include polyether-modified silicone, acrylic-modified silicone, polyester-modified silicone, and the like.

The content of the surface adjusting agent in the metallic base paint composition (A) is preferably 0.01 to 4 parts by mass, more preferably 0.05 to 3 parts by mass, and even more preferably 0.1 to 2 parts by mass, on a solids basis, based on 100 parts by mass of the metallic base paint composition (A), in terms of obtaining a multilayer coating film having high lightness near the highlight and high chroma over a wide range from the highlight to the bottom.

As the rheology control agent, a known rheology control agent can be used. Examples include silica-based fine powder, mineral-based rheology control agents, barium sulfate atomization powder, polyamide-based rheology control agents, organic resin fine particle rheology control agents, diurea-based rheology control agents, urethane association-type rheology control agents, polyacrylic acid-based rheology control agents, which are acrylic swelling-type, cellulose-based rheology control agents, and the like. Among these, in terms of obtaining a coating film with excellent metallic luster, it is preferable to use a mineral-based rheology control agent, a polyacrylic acid-based rheology control agent, or a cellulose-based rheology control agent; and it is particularly preferable to use a cellulose-based rheology control agent. These rheology control agents may be used singly, or in a combination of two or more.

Examples of mineral-based rheology control agents include swelling laminar silicate that has a 2:1 type crystal structure. Specific examples include smectite group clay minerals, such as natural or synthetic montmorillonite, saponite, hectorite, stevensite, beidellite, nontronite, bentonite, and laponite; swelling mica group clay minerals, such as Na-type tetrasilicic fluorine mica, Li-type tetrasilicic fluorine mica, Na salt-type fluorine taeniolite, and Li-type fluorine taeniolite; vermiculite; substitution products or derivatives thereof; and mixtures thereof.

Examples of polyacrylic acid-based rheology control agents include sodium polyacrylate, polyacrylic acid-(meth) acrylic acid ester copolymers, and the like.

Examples of commercial products of the polyacrylic acid-based rheology control agent include "Primal ASE-60," "Primal TT615," and "Primal RM5" (trade names, produced by The Dow Chemical Company); "SN Thickener 613," "SN Thickener 618," "SN Thickener 630," "SN Thickener 634," and "SN Thickener 636" (trade names, produced by San Nopco Limited); and the like. The acid value of the solids content of the polyacrylic acid-based rheology control agent is within the range of 30 to 300 mg KOH/g, and preferably 80 to 280 mg KOH/g.

Examples of cellulose-based rheology control agents include carboxymethylcellulose, methylcellulose, hydroxyethylcellulose, hydroxyethylmethylcellulose, hydroxypropylmethylcellulose, methylcellulose, cellulose nanofibers, and the like. Among these, cellulose nanofibers are preferably used, in terms of obtaining a coating film with excellent metallic luster.

The cellulose nanofibers may also be referred to as cellulose nanofibrils, fibrillated cellulose, or nanocellulose crystals.

The cellulose nanofibers have a number average fiber diameter within the range of preferably 2 to 500 nm, more preferably 2 to 250 nm, even more preferably 2 to 150 nm, in terms of obtaining a coating film with excellent metallic luster. The cellulose nanofibers also have a number average fiber length within the range of preferably 0.1 to 20 μm, more preferably 0.1 to 15 μm, and even more preferably 0.1 to 10 μm. The aspect ratio determined by dividing a number average fiber length by a number average fiber diameter is within the range of preferably 50 to 10000, more preferably 50 to 5000, and even more preferably 50 to 1000.

The number average fiber diameter and number average fiber length are measured and calculated from, for example, an image obtained by subjecting a sample (cellulose nanofibers diluted with water) to a dispersion treatment, casting the sample on a grid coated with a carbon film that has been subjected to a hydrophilic treatment, and observing the sample with a transmission electron microscope (TEM).

The cellulose nanofibers for use may be those obtained by defibrating a cellulose material, and stabilizing it in water. The cellulose material as used here refers to cellulose-main materials in various forms. Specific examples include pulp (e.g., grass plant-derived pulp, such as wood pulp, jute, Manila hemp, and kenaf); natural cellulose, such as cellulose produced by microorganisms; regenerated cellulose obtained by dissolving cellulose in a copper ammonia solution, a solvent of a morpholine derivative, or the like, and subjecting the dissolved cellulose to spinning; fine cellulose obtained by subjecting the cellulose material to, for example, a mechanical treatment, such as hydrolysis, alkali hydrolysis, enzymatic decomposition, blasting treatment, and vibration ball milling, to depolymerize the cellulose; and the like.

For the cellulose nanofibers, anionically modified cellulose nanofibers can be used. Examples of anionically modified cellulose nanofibers include carboxylated cellulose nanofibers, carboxymethylated cellulose nanofibers, phosphate group-containing cellulose nanofibers, and the like. The anionically modified cellulose nanofibers can be obtained, for example, by incorporating functional groups such as carboxyl groups, carboxymethyl groups, and phosphate groups into a cellulose material by a known method; washing the obtained modified cellulose to prepare a dispersion of the modified cellulose; and defibrating this dispersion. The carboxylated cellulose is also referred to as oxidized cellulose.

The oxidized cellulose can be obtained, for example, by oxidizing the cellulose material in water using an oxidizing agent in the presence of a compound selected from the group consisting of an N-oxyl compound, bromide, iodide, and a mixture thereof.

Examples of commercial products of the cellulose nanofibers include Rheocrysta (registered trademark) produced by DKS Co. Ltd., and the like.

The content of the rheology control agent in the metallic base paint composition (A) is preferably 0.01 to 3 parts by mass, more preferably 0.05 to 2 parts by mass, and even more preferably 0.1 to 1.5 parts by mass, on a solids basis, based on 100 parts by mass of the metallic base paint composition (A), in terms of obtaining a multilayer coating film having high lightness near the highlight and high chroma over a wide range from the highlight to the bottom.

The content of the cellulose-based rheology control agent in the metallic base paint composition (A) is preferably within the range of 2 to 150 parts by mass, and particularly preferably 3 to 120 parts by mass, based on 100 parts by mass of the aluminum pigment, in terms of obtaining a coating film having high lightness near the highlight and high chroma over a wide range.

In particular, when the metallic base paint composition (A) contains an aluminum pigment, it is preferred that the metallic base paint composition (A) contain a phosphate group-containing resin, in terms of the metallic luster and water resistance of the coating film to be obtained.

The phosphate group-containing resin can be produced by, for example, copolymerizing a phosphate group-containing polymerizable unsaturated monomer and other polymerizable unsaturated monomers by a known method, such as a solution-polymerization method. Examples of the phosphate group-containing polymerizable unsaturated monomer include acid phosphooxy ethyl(meth)acrylate, acid phosphooxy propyl(meth)acrylate, a reaction product of glycidyl (meth)acrylate and alkyl phosphoric acid, and the like. These can be used singly, or in a combination of two or more.

The metallic base paint composition (A) may further suitably contain, if necessary, an organic solvent, a pigment other than the aluminum pigment, a pigment dispersant, an antisettling agent, an antifoaming agent, an ultraviolet absorber, and the like. Examples of pigments other than the aluminum pigment include color pigments. The color pigment is not limited, and preferably comprises at least one member selected from the group consisting of a red pigment, an orange pigment, a yellow pigment, a green pigment, and a blue pigment; more preferably at least one member selected from the group consisting of a red pigment, an orange pigment, and a yellow pigment; and most preferably a red pigment.

Examples of red pigments include azo pigments, such as iron oxide pigments, azo lake pigments, insoluble azo pigments, and condensed azo pigments; anthanthrone pigments; anthraquinone pigments; perylene pigments; quinacridone pigments; diketopyrrolopyrrole pigments; and the like. Perylene pigments are preferable.

The metallic base paint composition (A) may contain a base resin and/or a dispersion resin, in terms of high lightness near the highlight and high chroma over a wide range from the highlight to the bottom in the coating film to be obtained. However, the effects of the present invention can be exhibited even if these resins are not substantially contained.

Examples of the base resin include acrylic resins, polyester resins, alkyd resins, urethane resins, and the like.

As the dispersion resin, existing dispersion resins, such as acrylic resin-based dispersion resins, epoxy resin-based dispersion resins, polycarboxylic acid resin-based dispersion resins, and polyester-based dispersion resins, can be used.

It is preferred that the metallic base coating film obtained by applying the metallic base paint composition (A) comprise the aluminum pigment, the light-scattering component, the surface adjusting agent, and the rheology control agent, the aluminum pigment being present in an amount of 15 to 70 parts by mass, and preferably 20 to 60 parts by mass, on a solids basis; and the light-scattering component being present in an amount of 5 to 55 parts by mass, and preferably 8 to 50 parts by mass, on a solids basis, based on 100 parts by mass of the total solids content of the metallic base coating film.

The metallic base paint composition (A) preferably has a paint solids content of 1 to 20%, and more preferably 2 to 15%.

Transparent Colored Layer

The transparent colored layer comprises a resin and a color pigment. The content of the color pigment is preferably 0.5 to 10 parts by mass, based on 100 parts by mass of the resin solids content of the transparent colored layer.

The transparent colored coating film as the transparent colored layer is formed by applying a transparent colored paint composition (B), and preferably drying the composition. The transparent colored coating film has a dry film thickness of preferably about 10 to 60 µm, and more preferably about 15 to 50 µm. A dry film thickness of 10 µm or more is advantageous in terms of good color development of the coating film. A dry film thickness of 60 µm or less is advantageous in terms of coating operation because popping, sagging, and the like are less likely to occur.

The transparent colored paint composition (B) comprises a resin and a color pigment. The resin comprises, for example, a base resin and a curing agent.

In one embodiment, the transparent colored paint composition (B) is a transparent colored base paint composition (B1).

Examples of the base resin contained in the transparent colored base paint composition (B1) include base resins, such as acrylic resins, polyester resins, alkyd resins, urethane resins, and epoxy resins that contain a crosslinkable functional group such as a carboxyl group or a hydroxyl group.

Examples of the curing agent contained in the transparent colored base paint composition (B1) include crosslinking agents, such as melamine resins, urea resins, and like amino resins, and blocked or unblocked polyisocyanate compounds. Among them, a thermosetting aqueous paint composition comprising at least one resin selected from the group consisting of a hydroxy-containing polyester resin and a hydroxy-containing acrylic resin as a base resin, and comprising a melamine resin as a curing agent, can be preferably used as the transparent colored base paint composition (RI).

The proportion of the base resin and the curing agent is such that the amount of the former is preferably 50 to 90 mass %, and more preferably 65 to 80 mass %, on a solids basis; and the amount of the latter is preferably 50 to 10 mass %, and more preferably 35 to 20 mass %, on a solids basis.

As the color pigment contained in the transparent colored base paint composition (B1), one color pigment may be used, or two or more color pigments may be used in combination. The color pigment contained in the transparent colored base paint composition (B1) is not limited, and preferably comprises at least one member selected from the group consisting of a red pigment, an orange pigment, a yellow pigment, a green pigment, and a blue pigment; more preferably at least one member selected from the group consisting of a red pigment, an orange pigment, and a yellow pigment; and most preferably a red pigment. Red pigments are effective for red-based paint colors.

In the present specification, a red-based paint color is specifically defined as a paint color in which the hue angle h in the $L^*C^*h$ color space diagram calculated based on the spectral reflectance of light illuminated at an angle of 45 degrees with respect to the coating film and received at an angle of 45 degrees deviated from the specular reflection light is within the range from −45 degrees or more to less than 45 degrees when the $a^*$ red direction is defined as 0 degrees. The $L^*C^*h$ color space is a color space devised from the $L^*a^*b^*$ color space, which was standardized in 1976 by the Commission Internationale de l'Eclairage, and also adopted in JIS L 8729.

Examples of red pigments include azo pigments, such as iron oxide pigments, azo lake pigments, insoluble azo pigments, and condensed azo pigments; anthanthrone pigments; anthraquinone pigments; perylene pigments; quinacridone pigments; diketopyrrolopyrrole pigments; and the like. Perylene pigments are preferable.

The color pigments may be used singly, or in a combination of two or more. The color pigment content in the transparent colored base paint composition (B1) is not particularly limited; and it is preferred that the color pigment content in the transparent colored base paint composition (B1) be 0.5 to 10 parts by mass, and preferably 0.7 to 3 parts by mass, based on 100 parts by mass of the resin solids content in the transparent colored base paint composition (B1).

The solids content of the transparent colored base paint composition (B1) may be 60 mass % or less, and the solids content at the time of application may be 10 to 50 mass %.

The transparent colored base paint composition (B1) may further optionally comprise commonly used additives for paints, such as an extender pigment, a curing catalyst, an ultraviolet absorber, a light stabilizer, a rheology control agent, an antioxidant, a surface adjusting agent, an antifoaming agent, and a wax.

In another embodiment, the transparent colored paint composition (B) is a transparent colored clear paint composition (B2).

Examples of the base resin contained in the transparent colored clear paint composition (B2) include base resins, such as acrylic resins, polyester resins, alkyd resins, and urethane resins that contain a crosslinkable functional group such as a carboxyl group, a hydroxyl group, a silanol group, an alkoxysilyl group, or an epoxy group.

Examples of the curing agent contained in the transparent colored clear paint composition (B2) include crosslinking agents such as melamine resins, urea resins, and like amino resins; blocked or unblocked polyisocyanate compounds; epoxy compounds; carboxy-containing compounds; acid anhydrides; and alkoxysilyl group-containing compounds.

The proportion of the base resin and the curing agent is such that the amount of the former is preferably 50 to 90 mass %, and more preferably 65 to 80 mass %, on a solids basis; and the amount of the latter is preferably 50 to 10 mass, and more preferably 35 to 20 mass %, on a solids basis.

As the color pigment contained in the transparent colored clear paint composition (B2), one color pigment may be used, or two or more color pigments may be used in combination. The color pigment content in the transparent colored clear paint composition (B2) is not particularly limited, and it is preferred that the color pigment content in the transparent colored clear paint composition (B2) be 0.5 to 3 parts by mass, preferably 0.8 to 2.5 parts by mass, and more preferably 1.0 to 1.5 parts by mass, based on 100 parts by mass of the resin solids content in the transparent colored clear paint composition (B2).

The solids content of the transparent colored clear paint composition (B2) may be 70 mass % or less, and the solids content at the time of application may be 10 to 60 mass %.

The transparent colored clear paint composition (B2) may further optionally comprise commonly used additives for paints, such as a curing catalyst, an ultraviolet absorber, a light stabilizer, a rheology control agent, an antioxidant, a surface adjusting agent, an antifoaming agent, and a wax.

It is preferred that the transparent colored coating film obtained by applying the transparent colored paint composition (B) comprise the resin in an amount of 97 to 99.5 parts by mass and the color pigment in an amount of 0.5 to 3 parts by mass, based on 100 parts by mass of the solids content of the transparent colored coating film. Such a configuration makes it possible to more easily form the laminate of the present invention.

The value of X in Equation 1 and the value of Y in Equation 2 of the laminate of the present invention can be suitably set by a person skilled in the art by selecting the components and their content in the metallic base paint composition (A) and the transparent colored paint composition (B). This makes it possible to more easily form a multilayer coating film having high lightness near the highlight and high chroma over a wide range from the highlight to the bottom.

Method for Forming Laminate and Configuration of Other Layers of Laminate

Examples of the configuration of the laminate of the present invention include the following configurations. The layers laminated on an object are listed from left to right, in the order in which they are laminated.

1. intermediate layer, base layer, metallic base layer, clear coat layer, transparent colored layer, and clear coat layer
2. intermediate layer, base layer, metallic base layer, and transparent colored layer
3. intermediate layer, base layer, metallic base layer, transparent colored layer, and clear coat layer
4. intermediate layer, metallic base layer, transparent colored layer, and clear coat layer
5. intermediate layer, metallic base layer, and transparent colored layer
6. intermediate layer, metallic base layer, transparent colored layer, and clear coat layer corresponding to clear coat coating film When the laminate of the present invention is a laminated film, the laminate can be formed by laminating and adhering films forming a metallic base layer, a transparent colored layer, and other layers (an intermediate layer corresponding to an intermediate coating film, a base layer corresponding to a base coating film, a clear coat layer corresponding to a clear coat coating film).

The metallic base layer and the transparent colored layer in the laminated film are respectively formed from a metallic base composition and a transparent colored paint composition respectively corresponding to the metallic base paint composition and the transparent colored paint composition.

The method for producing a film that can be used in place of a coating film is known, and a person skilled in the art can produce a laminated film having high lightness near the highlight and high chroma over a wide range from the highlight to the bottom that satisfies the requirements of Equation 1 and Equation 2, using ordinary skill in the art. For details of the production method for a laminated film, refer to JP2016-523742A, JP2008-110513A, JP2008-265029A, and the like.

When the laminate of the present invention is a multilayer coating film, the process for forming the multilayer coating film includes, for example, the following known processes. In the parentheses, the paints and compositions applied to an object are listed from left to right in the order in which they are applied.

Process I: 6-coat 3-bake method (intermediate paint (C)/baking/base paint (D)/metallic base paint composition (A)/clear coat paint composition (E)/baking/transparent colored paint composition (B)/clear coat paint composition (E)/baking)

Process II: 4-coat 2-bake method (intermediate paint (C)/baking/base paint (D)/metallic base paint composition (A)/transparent colored paint composition (B)/baking)

Process III: 5-coat 3-bake method (intermediate paint (C)/baking/base paint (D)/metallic base paint composition (A)/transparent colored paint composition (B)/baking/clear coat paint composition (E)/baking).

Process IV: 5-coat 2-bake method (intermediate paint (C)/metallic base paint composition (A)/clear coat paint composition (E)/baking/transparent colored paint composition (B)/clear coat paint composition (E)/baking)

Process V: 3-coat 1-bake method (intermediate paint (C)/metallic base paint composition (A)/transparent colored paint composition (B)/baking)

Process VI: 4-coat 2-bake method (intermediate paint (C)/metallic base paint composition (A)/transparent colored paint composition (B)/baking/clear coat paint composition (E)/baking)

Process I comprises the steps of: applying the intermediate paint (C) to an object to form an intermediate coating film; heating the intermediate coating film to cure the coating film; applying the base paint (D) to the cured intermediate coating film to form a base coating film; applying the metallic base paint composition (A) to the base coating film to form a metallic base coating film; applying the clear coat paint composition to the metallic base coating film to form a clear coat coating film; heating the uncured base coating film, the uncured metallic base coating film, and the uncured clear coat coating film to simultaneously cure these three coating films; applying the transparent colored paint composition (B) to the cured clear coat coating film to form a transparent colored coating film; applying the clear coat paint composition (E) to the transparent colored coating film to form a clear coat coating film; and heating the uncured transparent colored coating film and the uncured clear coat coating film to simultaneously cure these two coating films.

Process II comprises the steps of: applying the intermediate paint (C) to an object to form an intermediate coating film; heating the intermediate coating film to cure the coating film; applying the base paint (D) to the cured intermediate coating film to form a base coating film; applying the metallic base paint composition (A) to the base coating film to form a metallic base coating film; applying the transparent colored paint composition (B) to the metallic base coating film to form a transparent colored coating film; and heating the uncured base coating film, the uncured metallic base coating film, and the uncured transparent colored coating film to simultaneously cure these three coating films.

Process III comprises the steps of: applying the intermediate paint (C) to an object to form an intermediate coating film; heating the intermediate coating film to cure the coating film; applying the base paint (D) to the cured intermediate coating film to form a base coating film; applying the metallic base paint composition (A) to the base coating film to form a metallic base coating film; applying the transparent colored paint composition (B) to the metallic base coating film to form a transparent colored coating film; heating the uncured base coating film, the uncured metallic base coating film, and the uncured transparent colored coating film to simultaneously cure these three coating films; applying the clear coat paint composition (E) to the cured transparent colored coating film to form a clear coat coating film; and heating the uncured clear coat coating film to cure the coating film.

Process IV comprises the steps of: applying the intermediate paint (C) to an object to form an intermediate coating film; applying the metallic base paint composition (A) to the intermediate coating film to form a metallic base coating film; applying the clear coat paint composition to the metallic base coating film to form a clear coat coating film; heating the uncured intermediate coating film, the uncured metallic base coating film, and the uncured clear coat coating film to simultaneously cure these three coating films; applying the transparent colored paint composition (B) to the cured clear coat coating film to form a transparent colored coating film; applying the clear coat paint composition (E) to the transparent colored coating film to form a clear coat coating film; and heating the uncured transparent colored coating film and the uncured clear coat coating film to simultaneously cure these two coating films.

Process V comprises the steps of: applying the intermediate paint (C) to an object to form an intermediate coating film; applying the metallic base paint composition (A) to the intermediate coating film to form a metallic base coating film; applying the transparent colored paint composition (B) to the metallic base coating film to form a transparent colored coating film; and heating the uncured intermediate coating film, the uncured metallic base coating film, and the uncured transparent colored coating film to simultaneously cure these three coating films.

Process VI comprises the steps of: applying the intermediate paint (C) to an object to form an intermediate coating film; applying the metallic base paint composition (A) to the intermediate coating film to form a metallic base coating film; applying the transparent colored paint composition (B) to the metallic base coating film to form a transparent colored coating film; heating the uncured intermediate coating film, the uncured metallic base coating film, and the uncured transparent colored coating film to simultaneously cure these three coating films; applying the clear coat paint composition (E) to the cured transparent colored coating film to form a clear coat coating film; and heating the uncured clear coat coating film to cure the coating film.

Examples of the object to which the film or coating film of the laminate of the present invention is applied include exterior panel parts of vehicle bodies, such as passenger cars, trucks, motorcycles, and buses; vehicle components; exterior panel parts of household electric appliances, such as mobile phones, and audio equipment; and the like. Among these, exterior panel parts of vehicle bodies and vehicle components are preferable.

The material for the object is not particularly limited. Examples of the material include metallic materials, such as iron, aluminum, brass, copper, tin, stainless steel, galvanized steel, and steel plated with zinc alloys (e.g., Zn—Al, Zn—Ni, Zn—Fe); plastic materials, such as various types of fiber-reinforced plastics (FRP), polyethylene resins, polypropylene resins, acrylonitrile-butadiene-styrene (ABS) resins, polyamide resins, acrylic resins, vinylidene chloride resins, polycarbonate resins, polyurethane resins, epoxy resins, and like resins; inorganic materials, such as glass, cement, and concrete; wood; textile materials, such as paper and cloth; and the like. Among these materials, metallic materials and plastic materials are preferable.

The object to which the laminate is applied also includes exterior panel parts of vehicle bodies, vehicle components, household electric appliances, or metal substrates thereof, such as steel plates, whose metal surfaces may be subjected to a surface treatment, such as phosphate treatment, chromate treatment, or composite oxide treatment.

The object may or may not be surface-treated, and one or more coating films may be further formed thereon. For example, the object as a base material may be surface-treated, if necessary, and an undercoating film may be formed thereon; and an intermediate coating film may be further formed on the undercoating film. For example, when the object is a vehicle body, the undercoating film and the intermediate coating film can be formed by using known undercoat and intermediate paint compositions commonly used in the coating of vehicle bodies.

Examples of the undercoat paint composition for forming the undercoating film include electrodeposition paints, and preferably cationic electrodeposition paints. Examples of usable intermediate paint compositions for forming the intermediate coating film include paint compositions prepared using a base resin, such as an acrylic resin, polyester resin, alkyd resin, urethane resin, or epoxy resin that contain a crosslinkable functional group (e.g., a carboxyl or hydroxyl group); an amino resin, such as melamine resin or urea resin; and a crosslinking agent, such as a blocked or unblocked polyisocyanate compound, together with a pigment, a thickener, and other optional components.

In the present specification, the phrase "applying the metallic base paint composition (A) to an object" includes not only the case of directly applying the metallic base paint composition (A) to the object, but also the case of applying the metallic base paint composition (A) after the object is surface-treated and/or one or more additional layers, such as an undercoating film and/or an intermediate coating film, are formed on the object.

For example, as shown in Processes I to VI, the method for forming a multilayer coating film according to an embodiment of the present invention comprises the step of applying the intermediate paint (C) to an object to form an intermediate coating film. The intermediate paint (C) in Processes I to III contains a hydrophilic organic solvent as a medium, and the intermediate paint (C) in Processes IV to VI contains water as a medium.

The intermediate paint (C) is preferably a thermosetting paint that is commonly used in this field; and that contains a base resin, a crosslinking agent, and a medium comprising water and/or a hydrophilic organic solvent.

As the base resin and the crosslinking agent, known compounds commonly used in this field can be used. Examples of the base resin include acrylic resins, polyester resins, epoxy resins, polyurethane resins, and the like. Examples of the crosslinking agent include amino resins, polyisocyanate compounds, blocked polyisocyanate compounds, and the like. Examples of usable hydrophilic organic solvents include methanol, ethanol, n-propyl alcohol, isopropyl alcohol, ethylene glycol, and the like.

In addition to the above components, the intermediate paint (C) may suitably contain, if necessary, an ultraviolet absorber, an antifoaming agent, a thickener, a rust inhibitor, a surface adjusting agent, a pigment, and the like.

Examples of the pigment include color pigments, extender pigments, effect pigments, and the like. These may be used singly, or in a combination of two or more.

Examples of the color pigments include titanium oxide, zinc oxide, carbon black, molybdenum red, azo pigments, threne pigments, quinacridone pigments, isoindoline pigments, perylene pigments, dioxazine pigments, diketopyrrolopyrrole pigments, and the like. Among these, perylene can be preferably used.

Examples of the extender pigments include clay, kaolin, barium sulfate, barium carbonate, calcium carbonate, talc, silica, alumina white, and the like. Among these, barium sulfate and/or talc is preferably used. In particular, it is preferable to use barium sulfate with an average primary particle size of 1 μm or less, and more preferably 0.01 to 0.8 μm, as the extender pigment to provide a multilayer coating film having appearance with excellent smoothness.

In the present specification, the average primary particle size of barium sulfate is determined by observing barium sulfate using a scanning electron microscope, and averaging the maximum diameter of 20 barium sulfate particles on a straight line drawn at random on the electron microscope photograph.

Examples of the effect pigments include aluminum (including vapor-deposited aluminum), copper, zinc, brass, nickel, aluminum oxide, mica, titanium oxide- or iron oxide-coated aluminum oxide, titanium oxide- or iron oxide-coated mica, glass flakes, holographic pigments, and the like. These effect pigments can be used singly, or in a combination of two or more. Examples of aluminum pigments include non-leafing aluminum pigments and leafing aluminum pigments. Any of these pigments can be used.

When the intermediate paint (C) contains a pigment, the content of the pigment is generally within the range of 1 to 500 parts by mass, preferably 3 to 400 parts by mass, and more preferably 5 to 300 parts by mass, based on 100 parts by mass of the total resin solids content in the intermediate paint (C). In particular, it is preferred that the intermediate paint (C) contain a color pigment and/or an extender pigment, and that the total content of the color pigment and the extender pigment be generally within the range of 1 to 500 parts by mass, preferably 3 to 400 parts by mass, and particularly preferably 5 to 300 parts by mass, based on 100 parts by mass of the total resin solids content in the intermediate paint (C).

When the intermediate paint (C) contains a color pigment described above, the content of the color pigment may be generally within the range of 1 to 300 parts by mass, preferably 3 to 250 parts by mass, and more preferably 5 to 200 parts by mass, based on 100 parts by mass of the total resin solids content in the intermediate paint (C).

When the intermediate paint (C) contains an extender pigment described above, the content of the extender pigment may be generally within the range of 1 to 300 parts by mass, preferably 5 to 250 parts by mass, and more preferably 10 to 200 parts by mass, based on 100 parts by mass of the total resin solids content in the intermediate paint (C).

When the intermediate paint (C) contains an effect pigment described above, the content of the effect pigment may be generally within the range of 0.1 to 50 parts by mass, preferably 0.2 to 30 parts by mass, and more preferably 0.3 to 20 parts by mass, based on 100 parts by mass of the total resin solids content in the intermediate paint (C).

Coating of the intermediate paint (C) having the above structure can improve the surface smoothness, impact resistance, and chipping resistance of the coated article.

As the coating method of the intermediate paint (C), general coating methods commonly used in this field can be used. Examples of the coating method include coating methods using a brush or a coater. Among these, a coating method using a coater is preferable. Preferable examples of the coater include an airless spray coater, an air spray coater, and a rotary-atomization electrostatic coater, such as a paint cassette coater; a rotary-atomization electrostatic coater is particularly preferable.

The intermediate coating film is preferably a dried coating film obtained by applying the intermediate paint (C), followed by heating for curing, in terms of preventing the formation of a mixed layer between the intermediate coating film and a base coating film. In this case, the heating temperature is preferably within the range of 11.0 to 180° C., and particularly preferably 120 to 160° C. Moreover, the heat treatment time is preferably within the range of 10 to 60 minutes, and particularly preferably 15 to 40 minutes.

The cured film thickness of the intermediate (C) after heat treatment under the above conditions is preferably within the range of 10 to 50 μm, and particularly preferably 15 to 40 μm, in terms of high lightness near the highlight and high chroma over a wide range from the highlight to the bottom in the multilayer coating film to be obtained.

The film thickness having hiding power of color of the intermediate paint (C) is preferably 40 μm or less, more preferably 35 μm or less, and even more preferably 30 μm or less, in terms of, for example, the color stability of the multilayer coating film to be obtained. In the present specification, the "film thickness having hiding power of color" is a value obtained in the following manner. The monochrome checkered hiding power test paper specified in 4.1.2 of JIS K5600-4-1 is attached to a steel plate. Then, the paint is applied by inclined coating so that the film thickness continuously varies, and the paint is dried or cured. The coating surface is then visually observed under diffused daylight, and the minimum film thickness in which the monochrome border of the checker of the hiding power test paper disappears is measured by an electromagnetic film thickness meter. The measured value is the "film thickness having hiding power of color."

The method for forming a multilayer coating film according to an embodiment of the present invention may comprise the step of applying the base paint (D) to the intermediate coating film to form a base coating film, as shown in processes I to III above.

The base paint (D) for use may be a known paint composition. In particular, the base paint (D) for use is preferably a paint composition typically used in, for example, coating vehicle bodies.

The base paint (D) is preferably a paint containing a base resin, a crosslinking agent, and a medium composed of water and/or an organic solvent.

The base resin and crosslinking agent for use may be known compounds commonly used in the art.

The base resin is preferably a resin excellent in weatherability and transparency. Specifically, the base resin includes an acrylic resin, a polyester resin, an epoxy resin, and a urethane resin.

The base paint (D) may be an aqueous paint or a solvent-based paint. From the standpoint of decreasing VOCs of paint, the base paint (D) is preferably an aqueous paint. When the base paint (D) is an aqueous paint, the base resin for use can be a resin that contains hydrophilic groups (e.g., a carboxyl group, a hydroxyl group, a methylol group, an amino group, a sulfonate group, and a polyoxyethylene group; most preferably a carboxyl group) in an amount sufficient to solubilize or disperse the resin in water. By neutralizing the hydrophilic groups to form the system into an alkali salt, the base resin can be solubilized or dispersed in water. The amount of hydrophilic groups, for example, carboxyl groups, in doing this is not particularly limited, and can be freely determined depending on the solubility or dispersity in water. The amount of hydrophilic groups is typically about 10 mg KOH/g or more, and preferably 30 to 200 mg KOH/g, based on the acid value. Examples of alkaline substances for use in neutralization include sodium hydroxide and amine compounds.

The resin can be dispersed in water by subjecting the monomer component to emulsion polymerization in the presence of a surfactant and an optional water-soluble resin. The aqueous dispersion of the resin can also be obtained by dispersing the resin in water in the presence of, for example, an emulsifier. In this case of resin dispersion in water, the base resin may be completely free of hydrophilic groups; or may contain hydrophilic groups in an amount smaller than the water-soluble resin described above.

The crosslinking agent is for use in crosslinking and curing the base resin by heating. Examples include amino resins, polyisocyanate compounds (including unblocked polyisocyanate compounds and blocked polyisocyanate compounds), epoxy group-containing compounds, carboxy-containing compounds, carbodiimide group-containing compounds, hydrazide group-containing compounds, and semicarbazide group-containing compounds. Of these, amino resins and polyisocyanate compounds, which are reactive with hydroxyl groups, and carbodiimide group-containing compounds, which are reactive with carboxyl groups, are preferable. These crosslinking agents may be used singly, or in a combination of two or more.

Specifically, amino resins obtained by condensation or co-condensation of, for example, melamine, benzoguanamine, or urea with formaldehyde; or amino resins obtained by further etherifying such amino resins with a lower monohydric alcohol, are suitably used. Additionally, polyisocyanate compounds are also suitably used.

The proportion of each component of the base paint (D) can be freely determined, as required. However, from the standpoint of, for example, water resistance and appearance, it is preferred that the proportion of the base resin be typically 50 to 90 mass %, and particularly 60 to 85 mass %, based on the total mass of the base resin and crosslinking agent; and that the proportion of the crosslinking agent be typically 10 to 50 mass %, and particularly 15 to 40 mass %, based on the total mass of the base resin and crosslinking agent.

For the base paint (D), an organic solvent may optionally be used. Specifically, organic solvents typically used in paint are usable. Examples of organic solvents include hydrocarbons, such as toluene, xylene, hexane, and heptane; esters, such as ethyl acetate, butyl acetate, ethylene glycol monomethyl ether acetate, diethylene glycol monoethyl ether acetate, and diethylene glycol monobutyl acetate; ethers, such as ethylene glycol monomethyl ether, ethylene glycol diethyl ether, diethylene glycol monomethyl ether, and diethylene glycol dibutyl ether; alcohols, such as butanol, propanol, octanol, cyclohexanol, and diethylene glycol; and ketones, such as methyl ethyl ketone, methyl isobutyl ketone, cyclohexanone, and isophorone. These organic solvents may be used singly, or in a combination of two or more.

The base paint (D) may contain, for example, a color pigment, an extender pigment, an ultraviolet absorber, an antifoaming agent, a rheology control agent, a rust inhibitor, and a surface adjusting agent, as necessary, in addition to the components described above.

The base paint (D) is preferably a transparent coat or a colored paint.

When the base paint (D) is a transparent coat, the base resin (D) does not contain a color pigment, and may optionally contain an extender pigment. Examples of extender pigments include barium sulfate, barium carbonate, calcium carbonate, aluminum silicate, silica, magnesium carbonate, talc, and alumina white.

When an extender pigment is added, the amount of the extender pigment is preferably 0.1 to 30 parts by mass, and more preferably 0.1 to 20 parts by mass, per 100 parts by mass of the resin solids content in the base paint (D).

When the base paint (D) is a colored paint, the base paint (D) contains a color pigment. From the standpoint of light transmission control, the base paint (D) may contain a color pigment, such as titanium oxide and carbon black; and may further optionally contain a known color pigment, other than titanium oxide and carbon black. The color pigment is not particularly limited. Specifically, one pigment, or a combination of two or more pigments can be selected from, for example, composite metal oxide pigments (e.g., iron oxide pigments and titanium yellow), azo pigments, quinacridone pigments, diketopyrrolopyrrole pigments, perylene pigments, perinone pigments, benzimidazolone pigments, isoindoline pigments, isoindolinone pigments, metal chelate azo pigments, phthalocyanine pigments, indanthrone pigments, dioxane pigments, threne pigments, indigo pigments, and effect pigments.

When a color pigment is added, the amount of the color pigment is preferably 0.1 to 50 parts by mass, and more preferably 0.2 to 40 parts by mass, per 100 parts by mass of the resin solids content in the base paint (D).

From the standpoint of high lightness near the highlight of the obtained multilayer coating film and high chroma over a wide range from the highlight to the bottom, the thickness of a cured base coating film obtained from the base paint (D) is preferably 3 µm or more, more preferably 3 to 20 µm, and still more preferably 5 to 15 µm.

The base paint (D) can be applied by a typical method. Examples include methods such as air spray coating, airless spray coating, and rotary-atomization coating. When applying the base paint (D), electrostatic charge may optionally be applied. Of such methods, rotary-atomization electrostatic coating and air-spray electrostatic coating are preferable, with rotary-atomization electrostatic coating being particularly preferable.

When air spray coating, airless spray coating, or rotary-atomization coating is performed, it is preferred that the base paint (D) be adjusted to have a solids content and a viscosity suitable for coating by adding water and/or an organic solvent, and optional additives such as a rheology control agent and an antifoaming agent.

The base paint (D) has a solids content of 10 to 60 mass %, preferably 15 to 55 mass %, and still more preferably 20 to 50 mass %. The base paint (D) has a viscosity of preferably 200 to 7000 cps, more preferably 300 to 6000 cps, and still more preferably 500 to 5000 cps, as measured with a Brookfield-type viscometer at 20° C. and at 6 rpm.

The method for forming a multilayer coating film according to an embodiment of the present invention comprises, for example, the step of applying the metallic base paint composition (A) to a base coating film or an intermediate coating film to form a metallic base coating film, as shown in processes I to VI. The metallic base paint composition (A) is described above.

The metallic base paint composition (A) can be applied by a method, such as electrostatic coating, air spray, airless spray, rotary-atomization coating, or curtain coating. In particular, rotary-atomization electrostatic coating is preferably used in the method for forming a multilayer coating film according to the present invention.

The metallic base coating film obtained by applying the metallic base paint composition (A) is preferably dry. The method for drying the metallic base coating film is not particularly limited. Examples include a method in which the film is allowed to stand at room temperature for 15 to 30 minutes, and a method in which a film is preheated at a temperature of 50 to 100° C. for 30 seconds to 10 minutes.

The method for forming a multilayer coating film according to an embodiment of the present invention may comprise the step of applying the clear coat paint composition (E) or the transparent colored paint composition (B) to the metallic base coating film to form a clear coat coating film or a transparent colored coating film, as shown in processes I to VI above.

The transparent colored paint composition (B) is described above.

The clear coat paint composition (E) may be a single-component clear paint containing a base resin and a curing agent, or a two-component clear paint containing a hydroxy-containing resin and a polyisocyanate compound.

The clear coat paint composition (E) is an organic solvent-based or water-based, thermosetting paint that contains resin components such as a base resin and a crosslinking agent, and a solvent such as an organic solvent and water; and that may further optionally contain, for example, an ultraviolet absorber, and a light stabilizer. The clear coat paint composition (E) has transparency such that metallic feel of the lower-layer metallic base coating film can be visually perceived through a clear coat coating film obtained from this paint composition. The formulation of the clear coat paint composition (E) can be determined by suitably selecting components from among those described as components of the transparent colored paint composition (B).

Typically, the amount of the clear coat paint composition (E) and the transparent colored paint composition (B) applied is preferably determined such that each of the cured films thereof has a thickness of about 10 to 50 µm.

The clear coat paint composition (E) or transparent colored paint composition (B) can be applied by any method, and may be applied by the same method as for the metallic base paint composition (A). For example, the clear coat paint composition (E) or transparent colored paint composition (B) can be applied by a coating method, such as electrostatic coating, air spraying, airless spraying, rotary-atomization coating, or curtain coating.

After the clear coat paint composition (E) or transparent colored paint composition (B) is applied, and a clear coat coating film or transparent colored coating film is formed, preheating, for example, at a temperature of about 50 to 80° C. for about 3 to 10 minutes may be performed in order to facilitate volatilization of volatile components.

The method for forming a multilayer coating film according to an embodiment of the present invention may comprise the step of forming the clear coat paint composition (E) on the transparent colored coating film, as shown in processes I to VI. The clear coat paint composition (E) formed on the transparent colored coating film may be of the same formulation as that of the clear coat paint composition (E) formed on the metallic base coating film, or may be of a different formulation. For convenience, the same formulation is preferable. The method for applying the clear coat paint composition (E) is as described above.

Heating for baking can be performed by a known technique. For example, heating can be performed with a drying furnace, such as a hot-blast furnace, an electric furnace, or an infrared-guided heating furnace.

The heating temperature is preferably within the range of 70 to 180° C., and more preferably 80 to 170° C.

The heating time period is not particularly limited, and is preferably within the range of 10 to 40 minutes; and more preferably 20 to 30 minutes. The curing (baking) time period can be changed depending on the curing temperature, and is preferably within the range of about 10 to 40 minutes at 100 to 170° C.

The measurement of $C*15$, $C*25$, $C*45$, $C*75$, $L*15$, and $L*25$; and graininess (HG value) of the laminate, can be performed on the film or coating film of the laminate according to the present invention. The present invention may also have the following subject matter.
(1) A laminate comprising a metallic base layer and a transparent colored layer formed on the metallic base layer, wherein, when $$X=[(C*45)^2+(C*75)^2)]^{1/2}, \text{and}$$

$$Y=[(L*15)^2+(C*15)^2)]^{1/2}+[(L*25)^2+(C*25)^2)]^{1/2},$$

X is 64 or more, and Y is 191 or more; and
the measured value of graininess (HG value) is 45 or less, with the proviso that $C*15$, $C*25$, $C*45$, and $C*75$ represent chroma calculated from spectral reflectances of light illuminated at an incident angle of 45 degrees with respect to the laminate and received at respective angles of 15 degrees, 25 degrees, 45 degrees, and 75 degrees deviated from specular reflection light, and that $L*15$ and $L*25$ represent lightness calculated from spectral reflectances of light illuminated at an incident angle of 45 degrees with respect to the laminate and received at respective angles of 15 degrees and 25 degrees deviated from specular reflection light.
(2) The laminate according to (1), wherein X is 65 or more and 80 or less, and Y is 200 or more and 240 or less.
(3) The laminate according to (1) or (2), wherein the metallic base layer comprises an aluminum pigment in an amount of 15 to 70 parts by mass, on a solids basis, based on 100 parts by mass of the metallic base layer.
(4) The laminate according to any one of (1) to (3), further comprising a clear coat layer on the transparent colored layer.
(5) The laminate according to (1), (2), or (4), wherein the metallic base layer comprises an aluminum pigment, a light-scattering component, a surface adjusting agent, and a rheology control agent.
(6) The laminate according to (1), (2), (4), or (5), wherein the metallic base layer comprises an aluminum pigment in an amount of 15 to 70 parts by mass, on a solids basis, and a light-scattering component in an amount of 5 to 55 parts by mass, on a solids basis, based on 100 parts by mass of the metallic base layer.
(7) The laminate according to any one of (3) to (6), wherein the aluminum pigment comprises a vapor-deposition aluminum flake.
(8) The laminate according to any one of (3) to (6), wherein the aluminum pigment comprises an aluminum flake pigment whose surface is treated with silica.
(9) The laminate according to any one of (5) to (8), wherein the light-scattering component comprises a white pigment.
(10) The laminate according to any one of (5) to (8), wherein the light-scattering component comprises a titanium oxide-coated mica pigment, a white pigment, a titanium oxide-coated alumina flake pigment, or a combination of these pigments.
(11) The laminate according to (5), (6), (9), or (10), wherein the surface adjusting agent is one member, or two or more members, selected from the group consisting of a silicone-based surface adjusting agent, an acrylic-based surface adjusting agent, a vinyl-based surface adjusting agent, a fluorine-based surface adjusting agent, and an acetylenediol-based surface adjusting agent.
(12) The laminate according to (5), (6), (9), (10), or (11), wherein the rheology control agent comprises a cellulose-based rheology control agent.
(13) The laminate according to any one of (1) to (12), wherein the transparent colored layer comprises a resin and a color pigment.
(14) The laminate according to (13), wherein the amount of the color pigment is 0.5 to 10 parts by mass, based on 100 parts by mass of resin solids content of the transparent colored layer.
(15) The laminate according to (14), wherein the color pigment comprises at least one member selected from the group consisting of a red pigment, an orange pigment, a yellow pigment, a green pigment, and a blue pigment.
(16) The laminate according to any one of (1) to (15), wherein the metallic base layer has a film thickness of 0.02 to 5 μm.
(17) The laminate according to any one of (1) to (16), wherein the transparent colored layer has a film thickness of 10 to 60 μm.
(18) The laminate according to any one of (4) to (17), wherein the clear coat layer comprises a resin and a color pigment.
(19) The laminate according to (18), wherein the color pigment comprises at least one member selected from the group consisting of a red pigment, an orange pigment, a yellow pigment, a green pigment, and a blue pigment.
(20) The laminate according to any one of (1) to (19), wherein hue angle h is within the range of −45 to 45 degrees when the a* red direction is defined as 0 degrees.
(21) An object comprising the laminate according to any one of (1) to (20).

Below, the present invention is described in more detail with reference to Production Examples, Examples, and Comparative Examples. These Production Examples, Examples, and Comparative Examples are merely examples, and are not intended to restrict the scope of the present invention. In the Production Examples, Examples, and Comparative Examples, "parts" and "%" are based on mass, unless otherwise specified. The film thickness of a coating film is based on its cured coating film.

EXAMPLES

1. Production of Metallic Base Paint Composition (A)

Production of Phosphate Group-Containing Acrylic Resin (R-1)

Production Example 1

A mixture solvent of 27.5 parts of methoxy propanol and 27.5 parts of isobutanol was placed in a reactor equipped with a thermometer, a thermostat, a stirrer, a reflux condenser, and a dropping funnel; and heated to 110° C. While the mixture solvent was maintained at 110° C., 121.5 parts of a mixture containing 25 parts of styrene, 27.5 parts of n-butyl methacrylate, 20 parts of branched higher alkyl acrylate (trade name "Isostearyl Acrylate," produced by Osaka Organic Chemical Industry Ltd.), 7.5 parts of 4-hydroxybutyl acrylate, 15 parts of a phosphate group-containing polymerizable monomer described below, 12.5 parts of 2-methacryloyloxyethyl acid phosphate, 10 parts of isobutanol, and 4 parts of tert-butylperoxy octanoate was added dropwise to the mixture solvent over 4 hours. A mixture of 0.5 parts of tert-butylperoxy octanoate and 20 parts of isopropanol was further added dropwise for 1 hour. Thereafter, the mixture was aged with stirring for 1 hour, thereby obtaining a phosphate group-containing acrylic resin solution (R-1) with a solids content of 50%. The phosphate group-containing acrylic resin had an acid value of 83 mg KOH/g, a hydroxy value of 29 mg KOH/g, and a weight average molecular weight of 10000.

Phosphate Group-Containing Polymerizable Monomer: 57.5 parts of monobutyl phosphate and 41 parts of isobutanol were placed in a reactor equipped with a thermometer, a thermostat, a stirrer, a reflux condenser, and a dropping funnel; and heated to 90° C. Thereafter, 42.5 parts of glycidyl methacrylate was added dropwise over 2 hours, further followed by aging with stirring for 1 hour. Subsequently, 59 parts of isopropanol was added, thereby obtaining a phosphate group-containing polymerizable monomer solution with a solids content of 50%. The obtained monomer had an acid value of 285 mg KOH/g.

Production of Hydroxy-Containing Acrylic Resin (R-2)

Production Example 2

35 parts of propylene glycol monopropyl ether was placed in a reactor equipped with a thermometer, a thermostat, a stirrer, a reflux condenser, a nitrogen inlet tube, and a dropping funnel; and heated to 85° C. A mixture of 32 parts of methyl methacrylate, 27.7 parts of n-butyl acrylate, 20 parts of 2-ethylhexyl acrylate, 10 parts of 4-hydroxybutyl acrylate, 3 parts of hydroxypropyl acrylate, 6.3 parts of acrylic acid, 1 part of 2-acryloyloxyethyl acid phosphate, 15 parts of propylene glycol monopropyl ether, and 2.3 parts of 2,2'-azobis(2,4-dimethylvaleronitrile) was added dropwise over 4 hours. After the completion of dropwise addition, the mixture was aged for 1 hour. Thereafter, a mixture of 10 parts of propylene glycol monopropyl ether and 1 part of 2,2'-azobis(2,4-dimethylvaleronitrile) was further added dropwise over 1 hour. After the completion of dropwise addition, the mixture was aged for 1 hour. 7.4 parts of diethanolamine was further added, thereby obtaining a hydroxy-containing acrylic resin (R-2) solution with a solids content of 55%. The obtained hydroxy-containing acrylic resin (R-2) had an acid value of 51 mg KOH/g and a hydroxy value of 52 mg KOH/g.

Production of Acrylic Resin (R-3)

Production Example 3

37 parts of ethylene glycol monobutyl ether was placed in a reactor equipped with a thermometer, a thermostat, a stirrer, a reflux condenser, and a dropping funnel; and heated with stirring to maintain the reaction mixture at 110° C. A mixture of 10 parts of styrene, 35 parts of methyl methacrylate, 20 parts of 2-ethylhexyl methacrylate, 5 parts of N,N-dimethylaminoethyl methacrylate, 10 parts of 2-hydroxyethyl methacrylate, 20 parts of methoxy polyethylene glycol monomethacrylate (molecular weight: about 2080), 1 part of azobisisobutyronitrile, and 5 parts of isobutyl alcohol was added dropwise thereto over 3 hours. After the completion of dropwise addition, the mixture was aged at 110° C. for 30 minutes. Subsequently, an additional catalyst mixture of 20 parts of ethylene glycol monobutyl ether and 0.5 parts of azobisisobutyronitrile was added dropwise over 1 hour. After aging at 110° C. for 1 hour, the mixture was cooled, thereby obtaining an acrylic resin (R-3) solution with a solids content of 50%. The obtained resin had a weight average molecular weight of 20000.

Production of Polyester Resin (R-4)

Production Example 4

109 parts of trimethylol propane, 141 parts of 1,6-hexane diol, 126 parts of 1,2-cyclohexanedicarboxylic anhydride, and 120 parts of adipic acid were placed in a reactor equipped with a thermometer, a thermostat, a stirrer, a reflux condenser, and a water separator; and heated from 160° C. to 230° C. over 3 hours, followed by condensation reaction at 230° C. for 4 hours. Subsequently, to introduce carboxyl groups into the obtained condensation reaction product, 38.3 parts of trimellitic anhydride was added thereto, and the mixture was reacted at 170° C. for 30 minutes. The reaction mixture was diluted with 2-ethyl-1-hexanol, thereby obtaining a polyester resin (R-4) solution with a solids content of 70%. The obtained hydroxy-containing polyester resin had an acid value of 46 mg KOH/g, a hydroxy value of 150 mg KOH/g, and a number average molecular weight of 1400.

Production of Acrylic Resin Aqueous Dispersion (R-5)

Production Example 5

128 parts of deionized water and 2 parts of Adekaria Soap SR-1025 (trade name, produced by Adeka Corporation, emulsifier, active ingredient 25%) were placed in a reactor equipped with a thermometer, a thermostat, a stirrer, a reflux condenser, a nitrogen inlet tube, and a dropping funnel; and mixed with stirring in a nitrogen stream, followed by heating to 80° C.

Subsequently, 1% of the entire amount of a monomer emulsion for the core, described below, and 5.3 parts of a 6% ammonium persulfate aqueous solution were added to the reactor; and maintained at 80° C. for 15 minutes. Thereafter, the remaining monomer emulsion for the core was added dropwise over 3 hours to the reactor maintained at the same temperature. After the completion of dropwise addition, the mixture was aged for 1 hour. Subsequently, a monomer emulsion for the shell, described below, was added dropwise over 1 hour; and the mixture was aged for 1 hour, followed by cooling to 30° C., while 40 parts of a 5% 2-(dimethylamino) ethanol aqueous solution was gradually added to the reactor. The mixture was filtered with a 100-mesh nylon cloth for discharge, thereby obtaining an acrylic resin aqueous dispersion (R-5) with an average particle size of 100 nm and a solids content of 30%. The obtained acrylic resin aqueous dispersion had an acid value of 33 mg KOH/g and a hydroxy value of 25 mg KOH/g.

Monomer emulsion for the core: 40 parts of deionized water, 2.8 parts of Adekaria Soap SR-1025, 2.1 parts of methylene bisacrylamide, 2.8 parts of styrene, 16.1 parts of methyl methacrylate, 28 parts of ethyl acrylate, and 21 parts of n-butyl acrylate were mixed with stirring, thereby obtaining a monomer emulsion for the core.

Monomer emulsion for the shell: 17 parts of deionized water, 1.2 parts of Adekaria Soap SR-1025, 0.03 parts of ammonium persulfate, 3 parts of styrene, 5.1 parts of 2-hydroxyethyl acrylate, 5.1 parts of methacrylic acid, 6 parts of methyl methacrylate, 1.8 parts of ethyl acrylate, and 9 parts of n-butyl acrylate were mixed with stirring, thereby obtaining a monomer emulsion for the shell.

Production of Pigment Dispersion

Production Example 6

6 parts of the hydroxy-containing acrylic resin (R-2) (solids content: 3.3 parts), 35 parts of JR-903 (trade name, a rutile-form titanium oxide pigment produced by Tayca Corporation), and 18 parts of deionized water were placed in a stirring vessel; and homogeneously mixed, followed by further adding 2-(dimethylamino) ethanol to adjust the pH to 7.5. The obtained mixture was placed in a 225-ml resin bottle; and 130 parts of zirconia beads (size: 1.5 mm) were added thereto, followed by hermetically sealing the bottle. The pigment was dispersed for 120 minutes with a shaking-type paint mixer. After the pigment was dispersed, the zirconia beads were filtered through a 100-mesh metallic gauze and removed, thereby obtaining a white pigment dispersion (P-1) with a solids content of 66%.

Production Example 7

6 parts of the hydroxy-containing acrylic resin (R-2) (solids content: 3.3 parts), 35 parts of Paliogen Maroon L3920 (trade name, a perylene red pigment, produced by BASF A.G.), and 60 parts of deionized water were placed in a stirring vessel; and homogeneously mixed, followed by further adding 2-(dimethylamino) ethanol to adjust the pH to 7.5. The obtained mixture was placed in a 225-ml resin bottle; and 130 parts of zirconia beads (size: 1.5 mm) were added thereto, followed by hermetically sealing the bottle. The pigment was dispersed for 120 minutes with a shaking-type paint mixer. After the pigment was dispersed, the zirconia beads were filtered through a 100-mesh metallic gauze and removed, thereby obtaining a red pigment dispersion (P-2) with a solids content of 66%.

Production Example 8

327 parts of the hydroxy-containing acrylic resin solution (R-2) (solids content: 180 parts), 360 parts of deionized water, 6 parts of Surfynol (registered trademark) 104A (trade name, produced by Evonik Industries AG, an antifoaming agent, solids content: 50%), and 250 parts of Barifine BF-20 (trade name, produced by Sakai Chemical Industry Co., Ltd., barium sulfate powder, average particle size: 0.03 μm) were placed in a paint mixer, and a glass beads medium was added thereto; followed by mixing and dispersing at room temperature for 1 hour, thereby obtaining an extender pigment dispersion (P-3) with a solids content of 44%.

Production of Metallic Base Paint Composition (A)

Production Example 9

The components below were mixed with stirring, thereby preparing a metallic base paint (A-1).
Alpaste EMR-B6360: trade name, produced by Toyo Aluminium K.K., a non-leafing aluminum flake, average particle size D50: 10.3 μm, thickness: 0.19 μm, the surface is treated with silica, 8.66 parts (4.07 parts on a solids basis)
Iriodin 111 Rutile Fine Satin: trade name, produced by Merck & Co., Inc., a titanium oxide-coated mica pigment, average primary particle size: 5.8 μm, thickness: 0.34 μm), 4.12 parts (4.12 parts on a solids basis)
Rheocrysta: trade name, a cellulose-based rheology control agent=cellulose-nanofiber gel, produced by DKS Co. Ltd., solids content: 2%, 18.75 parts (0.38 parts on a solids basis)
BYK348 surface adjusting agent: trade name, produced by BYK, a silicone-based surface adjusting agent, solids content: 100%, 1 part (1 part on a solids basis)
Phosphate group-containing acrylic resin (R-1): 2.51 parts (1.26 parts on a solids basis)
Acrylic resin (R-3): 3.09 parts (1.55 parts on a solids basis)
Dimethylethanolamine: 0.26 parts
Distilled water, 73.98 parts Production Examples 10 to 23

Metallic base paints (A-2) to (A-15) were obtained in the same manner as in Production Example 9, except that the formulations were changed as shown in Table 1.

The following are the details of the starting materials shown in Table 1.
Hydroshine WS-3004: trade name, a vapor-deposition aluminum flake pigment for use in aqueous solutions, produced by Eckart, solids content: 10%, internal solvent: isopropanol, average particle size D50: 13 μm, thickness: 0.05 μm, the surface is treated with silica
Alpaste EM-B5690: trade name: non-leafing aluminum flake, produced by Toyo Aluminium K.K., average particle size DSO: 8.8 μm, thickness: 0.1 μm, the surface is treated with silica
Xirallic T60-10 Crystal Silver: trade name, a titanium oxide-coated alumina flake pigment, produced by Merck & Co., Inc., average primary particle size=about 19 μm, thickness: about 0.4 μm
Xirallic T61-10 Micro Silver: trade name, a titanium oxide-coated alumina flake pigment, produced by Merck & Co., Inc., average primary particle size: about 12 μm, average thickness: about 0.3 μm Production Example 24

14 parts of the extender pigment dispersion (P-3) on a solids basis, 40 parts of the acrylic resin aqueous dispersion (R-5) on a solids basis, 23 parts of the polyester resin solution (R-4) on a solids basis, 10 parts of UCOAT UX-310 (trade name, produced by Sanyo Chemical Industries, Ltd., an urethane resin aqueous dispersion, solids content: 40%) on a solids basis, and 27 parts of Cymel 251 (trade name, produced by Cytec Industries Japan LLC, melamine resin, solids content: 80%) on a solids basis, and 12 parts of GX-180A (trade name, produced by Asahi Kasei Metals Corporation, an aluminum pigment paste, aluminum content: 74%) were placed in a stirring vessel; and mixed with stirring, thereby preparing a silver base paint (A-16) with a solids content of 25%.

Production Example 25

The following commercially available aqueous basecoat paint (A-17-1) and aqueous basecoat paint (A-17-2) were used as a metallic base paint composition (A-17). The aqueous basecoat paint (A-17-1) and aqueous basecoat paint (A-17-2) were free of a light-scattering component.

A-17-1

WBC-716T No. 7321: trade name, produced by Kansai Paint Co., Ltd., an aqueous basecoat paint, metallic red, solids content: 30%

A-17-2

WBC-716T No. 7322: trade name, produced by Kansai Paint Co., Ltd., an aqueous basecoat paint, red, solids content: 30%

TABLE 1

| | | | Production Example No. | | | | | | | | | |
|---|---|---|---|---|---|---|---|---|---|---|---|---|
| | | | 9 | | 10 | | 11 | | 12 | | 13 | |
| | | | Name of Metallic Base Paint (A) | | | | | | | | | |
| | | | A-1 | | A-2 | | A-3 | | A-4 | | A-5 | |
| | | | Mass | Solids Content | Mass | Solids Content | Mass | Solids Content | Mass | Solids Content | Mass | Solids Content |
| Flake- aluminum Pigment | | WS3004 (NV; 10%) | | | | | | | | | 11.50 | 1.15 |
| | | EMR-B6360 (NV; 47%) | 8.66 | 4.07 | 8.43 | 3.96 | 8.45 | 3.97 | | 3.98 | | |
| | | EMR-B5690 (NV; 45%) | | | | | | | | | | |
| Light-scattering Agent | Intrareference Pigment | Iriodin, 111 R2 | 4.12 | 4.12 | | | | | | | | |
| | | Xirallic T60-10 R2 | | | | | | | | | | |
| | | Crystal Silver Xirallic T61-10 R2 | | | | | | | | | | |
| | | Micro Silver | | | | | | | | | | |
| Others | White Pigment | White Pigment Dispersion (P-1) | | | 1.29 | 0.85 | 2.16 | 1.43 | 2.00 | | 1.13 | 0.75 |
| | Red Pigment | Red Pigment Dispersion (P-2) | | | | | | | | | | |
| | Surface Adjusting Agent | BYK-348 (NV; 100%) | 1 | 1 | 1 | 1 | 1 | 1 | 1 | 1 | 1 | 1 |
| | Rheology Control Agent | Rheocrysta (NV; 2%) | 18.75 | 0.38 | 18.75 | 0.38 | 18.75 | 0.38 | | 0.38 | 18.75 | 0.38 |
| | Resin | Phosphata Group-Containing Acrylic Resin (R-1) | 2.51 | 1.26 | 2.45 | 0.33 | 2.45 | 0.33 | 1.23 | | 0.64 | 0.32 |
| | | Acrylic Resin (R-3) | 3.09 | 1.55 | 1.40 | 0.40 | 1.40 | 0.40 | 0.70 | | 0.37 | 0.19 |
| | Diethylethanolamine | | 0.26 | 0 | 0.25 | 0 | 0.25 | 0 | | 0 | 0.07 | 0 |
| | Distilled Water | | 73.98 | 0 | 74.54 | 0 | 74.24 | 0 | | 0 | 70.31 | 0 |
| Total | | | 112.37 | 12.37 | 104.32 | 6.97 | 104.32 | 7.49 | | 9.28 | 103.77 | 3.78 |
| Properties of Paint | | Paint Solids Content/% (NV) | 11.0% | | 6.6% | | 7.2% | | 8.5% | | 3.6% | |
| | | Paint Viscosity B60/mpa·s | 388 | | 450 | | 428 | | 400 | | 316 | |

| | | | Production Example No. | | | | | | | | | |
|---|---|---|---|---|---|---|---|---|---|---|---|---|
| | | | 14 | | 15 | | 16 | | 17 | | 18 | |
| | | | Name of Metallic Base Paint (A) | | | | | | | | | |
| | | | A-6 | | A-7 | | A-8 | | A-9 | | A-10 | |
| | | | Mass | Solids Content | Mass | Solids Content | Mass | Solids Content | Mass | Solids Content | Mass | Solids Content |
| Flake- aluminum Pigment | | WS3004 (NV; 10%) | | | | | | | 11.49 | 1.15 | 11.61 | 1.16 |
| | | EMR-B6360 (NV; 47%) | | | 8.48 | 3.99 | 8.67 | 4.07 | | | | |
| | | EMR-B5690 (NV; 45%) | 4.88 | 2.20 | | | | | | | | |
| Light-scattering Agent | Intrareference Pigment | Iriodin, 111 R2 | 2.11 | 2.11 | | | | | | | 1.07 | 1.07 |
| | | Xirallic T60-10 R2 | | | 5.16 | 5.16 | | | | | | |
| | | Crystal Silver Xirallic T61-10 R2 | | | | | 5.06 | 5.06 | | | | |
| | | Micro Silver | | | | | | | | | | |
| Others | White Pigment | White Pigment Dispersion (P-1) | | | | | | | 0.57 | 0.38 | 1.15 | 0.76 |

TABLE 1-continued

| | | | | | | | | | | | | |
|---|---|---|---|---|---|---|---|---|---|---|---|---|
| Others | Red Pigment | Red Pigment Dispersion (P-2) | | | | | | | | | | |
| | Surface Adjusting Agent | BYK-348 (NV; 100%) | 1 | 1 | 1 | 1 | 1 | 1 | 1 | 1 | 1 | 1 |
| | Rheology Control Agent | Rheocrysta (NV; 2%) | 18.75 | 0.38 | 18.75 | 0.38 | 18.75 | 0.38 | 18.75 | 0.38 | 18.75 | 0.38 |
| | Resin | Phosphata Group-Containing Acrylic Resin (R-1) | 1.28 | 0.64 | 2.50 | 1.25 | 2.52 | 1.26 | 0.64 | 0.32 | 0.65 | 0.33 |
| | | Acrylic Resin (R-3) | 1.58 | 0.79 | 3.49 | 1.75 | 3.47 | 1.74 | 1.10 | 0.55 | 0.80 | 0.70 |
| | Diethylethanolamine | | 0.13 | 0 | 0.26 | 0 | 0.26 | 0 | 0.07 | 0 | 0.07 | 0 |
| | Distilled Water | | 77.42 | 0 | 73.82 | 0 | 73.79 | 0 | 70.52 | 0 | 70.38 | 0 |
| Total | | | | | | | | | 104.14 | 3.77 | 105.48 | 5.09 |
| Properties of Paint | Paint Solids Content/% (NV) | | 6.6% | | 11.9% | | 11.9% | | 3.6% | | 4.8% | |
| | Paint Viscosity B60/mpa·s | | 364 | | 420 | | 266 | | 316 | | 332 | |

| | | | Production Example No. | | | | | | | | |
|---|---|---|---|---|---|---|---|---|---|---|---|
| | | | 19 | | 20 | | 21 | | 22 | | 23 | |
| | | | Name of Metallic Base Paint (A) | | | | | | | | | |
| | | | A-11 | | A-12 | | A-13 | | A-14 | | A-15 | |
| | | | Mass | Solids Content | Mass | Solids Content | Mass | Solids Content | Mass | Solids Content | Mass | Solids Content |
| Flake-aluminum Pigment | | WS3004 (NV; 10%) | | | | | 4.39 | 0.44 | 11.50 | 1.15 | 5.70 | 0.57 |
| | | EMR-B6360 (NV; 47%) | 8.87 | 4.17 | 4.04 | | | | | | 2.43 | 1.14 |
| | | EMR-B5690 (NV; 45%) | | | | | | | | | | |
| Light-scattering Agent | Intrareference Pigment | Iriodin, 111 R2 | 4.23 | 4.23 | 4.10 | | | | | | | |
| | | Xirallic T60-10 R2 Crystal Silver | | | | | | | | | | |
| | | Xirallic T61-10 R2 Micro Silver | | | | | | | | | | |
| | White Pigment | White Pigment Dispersion (P-1) | 4.54 | 3.00 | | | | | | | | |
| Others | Red Pigment | Red Pigment Dispersion (P-2) | | | 0.91 | 1.14 | 0.35 | | 2.92 | 0.89 | 2.89 | 0.88 |
| | Surface Adjusting Agent | BYK-348 (NV; 100%) | 1 | 1 | 0.5 | 0.5 | 0.5 | 0.5 | 0.5 | 0.5 | 0.5 | 0.5 |
| | Rheology Control Agent | Rheocrysta (NV; 2%) | 18.75 | 0.38 | 0.38 | | 18.75 | 0.38 | 18.75 | 0.38 | 18.75 | 0.38 |
| | Resin | Phosphata Group-Containing Acrylic Resin (R-1) | 2.58 | 1.29 | 1.25 | 0.25 | 0.13 | | 0.64 | 0.32 | 0.96 | 0.48 |
| | | Acrylic Resin (R-3) | 3.16 | 1.58 | 1.54 | 0.14 | 0.07 | | 0.37 | 0.19 | 0.55 | 0.28 |
| | Diethylethanolamine | | 0.27 | 0 | 0 | | 0.03 | 0 | 0.07 | 0 | 0.10 | 0 |
| | Distilled Water | | 73.80 | 0 | 0 | | 76.58 | 0 | 68.67 | 0 | 79.29 | 0 |
| Total | | | 117.20 | 15.64 | 12.71 | | 101.78 | 1.86 | 103.42 | 3.42 | 104.17 | 4.23 |
| Properties of Paint | Paint Solids Content/% (NV) | | 13.3% | | 11.3% | | 1.8% | | 3.3% | | 4.1% | |
| | Paint Viscosity B60/mpa·s | | 268 | | 425 | | 564 | | 453 | | 638 | |

2. Production of Transparent Colored Paint Composition (B)

B-1

(B-1) was obtained by adding 1.21 parts of Paliogen Maroon L3920 (trade name, produced by BASF A.G., an organic perylene pigment) to KINO6510 (trade name, Kansai Paint Co., Ltd., a hydroxy/isocyanate group-curable acrylic urethane resin-based two-component organic solvent paint), based on 100 parts by mass of the resin solids content in KINO6510.

B-2

(B-2) was obtained by adding 1.01 parts of Paliogen Maroon L3920 (trade name, produced by BASF A.G., an organic perylene pigment) to KINO6510 (trade name, Kansai Paint Co., Ltd., a hydroxy/isocyanate group-curable acrylic urethane resin-based two-component organic solvent paint), based on 100 parts by mass of the resin solids contained in KINO6510.

B-3

(B-3) was obtained by adding 0.81 parts of Paliogen Maroon L3920 (trade name, BASF A.G., an organic perylene pigment) was added to KINO6510 (trade name, Kansai Paint Co., Ltd., a hydroxy/isocyanate group-curable acrylic urethane resin-based two-component organic solvent paint), based on 100 parts by mass of the resin solids content in KINO6510.

B-4

(B-4) was obtained by adding 0.60 parts of Paliogen Maroon L3920 (trade name, produced by BASF A.G., an organic perylene pigment) to KINO6510 (trade name, Kansai Paint Co., Ltd., a hydroxy/isocyanate group-curable acrylic urethane resin-based two-component organic solvent paint), based on 100 parts by mass of the resin solids content in KINO6510.

B-5

(B-5) was obtained by adding 1.21 parts of Paliogen Maroon L3920 (trade name, produced by BASF A.G., an organic perylene pigment) to WBC-716T Enamel Clear (trade name, produced by Kansai Paint Co., Ltd., an aqueous basecoat paint, transparent), based on 100 parts by mass of the resin solids content in WBC-716T Enamel Clear.

3. Production of Intermediate Paint Composition

C-1

TP-65 No. 8110: trade name, produced by Kansai Paint Co., Ltd., solvent-based red intermediate paint, the L* value of the obtained coating film: 20

C-2

WP-522H N-2.0: trade name, produced by Kansai Paint Co., Ltd., a polyester-resin-based aqueous intermediate paint, the L* value of the obtained coating film: 20

4. Production of Base Paint Composition

D-1

Production Example 26

14 parts of the extender pigment dispersion (P-3) on a solids basis, 40 parts of the acrylic resin aqueous dispersion (R-5) on a solids basis, 23 parts of the polyester resin solution (R-4) on a solids basis, 10 parts of UCOAT TJX-310 (trade name, produced by Sanyo Chemical Industries, Ltd., a urethane resin aqueous dispersion, solids content: 40%) on a solids basis, and 27 parts of Cymel 251 (trade name, produced by Cytec Industries Japan LLC, melamine resin, solids content: 80%) on a solids basis were added to a stirring vessel; and mixed with stirring, thereby preparing a colorless clear base paint (D-1).

5. Production of Clear Coat Paint Composition

E-1

KINO6510: trade name: Kansai Paint Co., Ltd., a hydroxy/isocyanate group-curable acrylic urethane resin-based two-component organic solvent paint)

6. Preparation of Object

A steel plate degreased and treated with zinc phosphate JISG3141, size: 400 mm×300 mm×0.8 mm) was coated with an Electron GT-10 cationic electrodeposition paint (trade name: produced by Kansai Paint Co., Ltd., a block polyisocyanate compound is used as a crosslinking agent in au epoxy-resin polyamine-based cationic resin) by electrodeposition such that the coated film had a film thickness of 20 μm on a cured coating film basis. The coated film was heated at 170° C. for 20 minutes to allow the coated film to be crosslinked and cured, thereby forming an electrodeposition coating film, which was determined to be a first substrate as an object.

7. Preparation of Test Plate

Example 1

Step (1): The intermediate paint (C-1) was electrostatically applied to the first substrate to give a cured film thickness of 35 μm with a rotary-atomization-bell coater, and heated at 140° C. for 30 minutes to allow the film to be crosslinked and cured.

Step (2): Subsequently, the transparent base paint (D-1) was electrostatically applied to the cured coating film to give a cured film thickness of 10 μm with a rotary-atomization-bell coater, and allowed to stand for 2 minutes.

Step (3): Additionally, the metallic base paint (A-1) was adjusted to have a paint viscosity shown in Table 1, and applied to the coating film with a Robot Bell (produced by ABB) at a booth temperature of 2.3° C. and a humidity of 68% to give a film thickness of 2.3 μm on a dry coating film basis. Thereafter, the film was allowed to stand at 80° C. for 3 minutes.

Step (4): Subsequently, the transparent colored paint (B-1) was applied to the surface of the dry coating film with a Robot Bell (produced by ABB) at a booth temperature of 23° C. and a humidity of 68% to give a film thickness of 30 μm on a dry coating film basis. After coating, the film was allowed to stand at room, temperature for 7 minutes; and heated using a hot-air-circulation drying oven at 140° C. for 30 minutes to dry the multilayer coating film simultaneously, thereby preparing a test plate.

The film thickness of the dry metallic base coating film shown in Table 2 was calculated using equation (2). The same applies to the Examples below.

$$x = (sc \ast 10000)/(S \ast sg) \quad (2)$$

x: film thickness (μm)

sc: application solids content (g)

S: area of evaluated application solids content (cm$^2$)

sg: specific gravity of coating film (g/cm$^3$)

Examples 2 to 15 and Comparative Examples 1 to 3

Test plates were prepared in the same manner as in Example 1, except that the paint and film thickness were as shown in Table 2.

Examples 16

Step (1): The intermediate paint (C-1) was electrostatically applied to the first substrate with a rotary-atomization-bell coater to give a cured film thickness of 30 µm; and heated at 140° C. for 30 minutes to allow the film to be crosslinked and cured, thereby forming an intermediate coating film.

Step (2): The transparent base paint (D-1) was applied to the intermediate coating film with a rotary-atomization electrostatic coater to give a film thickness of 10 nm on a cured coating film basis. After being allowed to stand for 3 minutes, the coating film was preheated at 80° C. for 3 minutes, thereby forming an uncured base coating film.

Step (3): Subsequently, the metallic base paint (A-1), prepared as described above, was applied to the obtained uncured base coating film with a Robot Bell (produced by ABB) at a booth temperature of 23° C. and a humidity of 68% to give a film thickness of 1.0 µm on a dry coating film basis. The coating film was allowed to stand for 3 minutes; and then allowed to stand at 80° C. for 3 minutes, thereby forming an uncured metallic coating film.

Step (4): Additionally, the clear coat paint (E-1) was applied to the obtained uncured metallic coating film with a Robot Bell (produced by ABB) at a booth temperature of 23° C. and a humidity of 68% to give a film thickness of 35 µm on a dry coating film basis, thereby forming an uncured clear coating film. After coating, the film was allowed to stand at room temperature for 7 minutes, and then heated using a hot-air-circulation drying oven at 140° C. for 30 minutes to dry the three-layered coating film simultaneously, thereby forming a multilayer coating film.

Step (5): Subsequently, the transparent colored paint (B-5) was applied to this multilayer coating film with a rotary-atomization electrostatic coater to give a film thickness of 20 µm on a cured coating film basis. After being allowed to stand for 3 minutes, the film was preheated at 80° C. for 3 minutes, thereby forming an uncured transparent colored coating film.

Step (6): Additionally, the clear coat paint (E-1) was applied to the obtained uncured transparent colored coating film with a Robot Bell (produced by ABB) at a booth temperature of 23° C. and a humidity of 68% to give a film thickness of 35 µm on a dry coating film basis, thereby forming a clear coating film. After coating, the film was allowed to stand at room temperature for 7 minutes, and then heated using a hot-air-circulation drying oven at 140° C. for 30 minutes to dry the three-layered coating film simultaneously; thereby forming a multilayer coating film, which was determined to be a test plate.

Example 17

After step (4) in Example 1, the clear coat paint (E-1) was applied with a Robot Bell (produced by ABB) at a booth temperature of 23° C. and a humidity of 68% to give a film thickness of 35 µm on a dry coating film basis, thereby forming a clear coating film. After coating, the coated film was allowed to stand at room temperature for 7 minutes, and then heated using a hot-air-circulation drying oven at 140° C. for 30 minutes; thereby forming a multilayer coating film, which was determined to be a test plate.

Example 18

Step (1): The intermediate paint (C-2) was electrostatically applied to substrate 1 the first substrate with a rotary-atomization-bell coater to give a cured film thickness of 30 µm. After being allowed to stand for 3 minutes, the film was preheated at 80° C. for 3 minutes, thereby forming an uncured intermediate coating film.

Step (2): Additionally, the metallic base paint (A-1), prepared as described above, was applied to the obtained uncured intermediate coating film with a Robot Bell (produced by ABB) at a booth temperature of 23° C. and a humidity of 68% to give a film thickness of 1.0 µm on a dry coating film basis. The film was allowed to stand for 3 minutes; and then allowed to stand at 80° C. for 3 minutes, thereby forming an uncured metallic base coating film.

Step (3): Subsequently, the clear coat paint (E-1) was applied to this uncured metallic coating film with a. Robot Bell (produced by ABB) at a booth temperature of 23° C. and a humidity of 68% to give a film thickness of 35 µm on a dry coating film basis, thereby forming a clear coating film. After coating, the coated film was allowed to stand at room temperature for 7 minutes, and then heated using a hot-air-circulation drying oven at 140° C. for 30 minutes to dry the three-layered coating film simultaneously; thereby forming a multilayer coating film.

Step (4): Subsequently, the transparent colored paint (B-5) was applied to this multilayer coating film with a rotary-atomization electrostatic coater to give a film thickness of 20 µm on a cured coating film basis. After being allowed to stand for 3 minutes, the film was preheated at 80° C. for 3 minutes, thereby forming an uncured colored transparent coating film.

Step (5): Additionally, the clear coat paint (E-1) was applied to the obtained uncured colored transparent coating film with a Robot Bell (produced by ABB) at a booth temperature of 23° C. and a humidity of 68% to give a film thickness of 35 µm on a dry coating film basis, thereby forming a clear coating film. After coating, the film was allowed to stand at room temperature for 7 minutes, and then heated using a hot-air-circulation drying oven at 140° C. for 30 minutes to dry the two-layered coating film simultaneously; thereby forming a multilayer coating film, which was determined to be a test plate.

Example 19

Step (1): The intermediate paint (C-2) was electrostatically applied to substrate 1 the first substrate with a rotary-atomization-bell coater to give a cured film thickness of 30 µm. After being allowed to stand for 3 minutes, the film was preheated at 80° C. for 3 minutes, thereby forming an uncured intermediate coating film.

Step (2): Subsequently, the metallic base paint (A-1), prepared as described above, was applied to the obtained uncured intermediate coating film with a Robot Bell (produced by ABB) at a booth temperature of 23° C. and a humidity of 68% to give a film thickness of 1.0 μm on a dry coating film basis. The film was allowed to stand for 3 minutes; and then allowed to stand at 80° C. for 3 minutes, thereby forming an uncured effect pigment-containing coating film.

Step (3): Additionally, the transparent colored paint (B-1) was applied to this uncured effect pigment-containing coating film with a Robot Bell (produced by ABB) at a booth temperature of 23° C. and a humidity of 68% to give a film thickness of 35 μm on a dry coating film basis, thereby forming a colored transparent coating film. After coating, the film was allowed to stand at room temperature for 7 minutes, and then heated using a hot-air-circulation drying oven at 140° C. for 30 minutes to dry the three-layered coating film simultaneously; thereby forming a multilayer coating film, which was determined to be a test plate.

Example 20

After the steps in Example 19, the clear coat paint (E-1) was applied with a Robot Bell (produced by ABB) at a booth temperature of 23° C. and a humidity of 68% to give a film thickness of 35 μm on a dry coating film basis, thereby forming a clear coating film. After coating, the film was allowed to stand at room temperature for 7 minutes; and then heated using a hot-air-circulation drying oven at 140° C. for 30 minutes to form a multilayer coating film, which was determined to be a test plate.

Comparative Example 4

Step (1): The intermediate paint (C-1) Was electrostatically applied to the first substrate with a rotary-atomization-bell coater to give a cured film thickness of 30 μm; and then heated at 140° C. for 30 minutes to allow the film to be crosslinked and cured, thereby forming an intermediate coating film.

Step (2): The metallic base paint (A-16) was applied to the intermediate coating film with a rotary-atomization electrostatic coater to give a film thickness of 15 μm on a cured coating film basis. After being allowed to stand for 3 minutes, the film was preheated at 80° C. for 3 minutes, thereby forming an uncured metallic base coating film.

Step (3): Additionally, the transparent colored paint (B-1) was applied to this uncured metallic base coating film with a Robot Bell (produced by ABB) at a booth temperature of 23° C. and a humidity of 68% to give a film thickness of 35 μm on a dry coating film basis, thereby forming a colored transparent coating film. After coating, the film was allowed to stand at room temperature for 7 minutes, and then heated using a hot-air-circulation drying oven at 140° C. for 30 minutes to dry the two-layered coating film simultaneously; thereby forming a multilayer coating film, which was determined to be a test plate.

Comparative Example 5

Step (1): The intermediate paint (C-1) was electrostatically applied to the first substrate with a rotary-atomization-bell coater to give a cured film thickness of 30 inn; and then heated at 140° C. for 30 minutes to allow the film to be crosslinked and cured, thereby forming an intermediate coating film.

Step (2): The metallic base paint (A-17-1) was applied to the intermediate coating film with a rotary-atomization electrostatic water to give a film thickness of 15 μm on a cured coating film basis. After being allowed to stand for 3 minutes, the base paint (A-17-2) was applied with a rotary-atomization electrostatic coater to give a film thickness of 15 μm on a cured coating film basis, and then allowed to stand for 3 minutes: followed by preheating the film at 80° C. for 3 minutes, thereby forming an uncured metallic base coating film.

Step (3): Additionally, the clear coat paint (E-1) was applied to this uncured metallic base coating film with a Robot Bell (produced by ABB) at a booth temperature of 23° C. and a humidity of 68% to give a film thickness of 35 μm on a dry coating film basis, thereby forming a clear coating film. After coating, the film was allowed to stand at room temperature for 7 minutes, and then heated using a hot-air-circulation drying oven at 140° C. for 30 minutes to dry the two-layered coating film simultaneously; thereby forming a multilayer coating film, which was determined to be a test plate.

Comparative Example 6

Step (1): The intermediate paint (C-1) was electrostatically applied to the first substrate with a rotary-atomization-bell coater to give a cured film thickness of 35 μm; and then heated at 140° C. for 30 minutes to allow the film to be crosslinked and cured.

Step (2): Subsequently, the transparent base paint (D-1) was electrostatically applied to the cured coating film with a rotary-atomization-bell coater to give a cured film thickness of 10 μm; and then allowed to stand for 2 minutes.

Step (3): Additionally, the metallic base paint (A-17-1) was adjusted to a paint viscosity shown in Table 1, and applied to the coating film with a Robot Bell (produced by ABB) at a booth temperature of 2.3° C. and a humidity of 68% to give a film thickness of 15 μm on a dry coating film basis. After the film was allowed to stand for 3 minutes, the base paint (A-17-2) was applied thereto with a rotary-atomization electrostatic coater to give a film thickness of 15 μm on a cured coating film basis. After being allowed to stand for 3 minutes, the film was preheated at 80° C. for 3 minutes, thereby forming an uncured metallic base coating film.

Step (4): Subsequently, the transparent colored paint (B-1) was applied to the surface of the dry coating film with a. Robot Bell (produced by ABB) at a booth temperature of 23° C. and a humidity of 68% to give a film thickness of 30 μm on a dry coating film basis. After coating, the film was allowed to stand at room temperature for 7 minutes; and then heated using a hot-air-circulation drying oven at 140° C. for 30 minutes to dry the multilayer coating film simultaneously.

step (5): Thereafter, the clear coat paint (E-1) was applied with a. Robot Bell (produced by ABB) at a booth temperature of 23° C. and a humidity of 68% to give a film thickness of 35 μm on a dry coating film basis, thereby forming a clear coating film. After coating, the film was allowed to stand at room temperature for 7 minutes, and then heated using a hot-air-circulation drying oven at 140° C. for 30 minutes; thereby forming a multilayer coating film, which was determined to be a test plate.

8. Evaluation of Coating Film

The appearance and properties of the coating films of the test plates obtained as described above were evaluated. Table 2 illustrates the results.

Measurement of Chroma C*

Table 2 illustrates chroma C*15, C*25, C*45, C*75, and C*110 in the L*C*h* color space calculated from spectral reflectance of light illuminated at an angle of 45 degrees with respect to the coating film and received at respective angles of 15 degrees, 25 degrees, 45 degrees, 75 degrees, and 110 degrees deviated from the specular reflection light. The measurement was performed with a multi-angle spectrophotometer (produced by X-Rite, Inc.; trade name MA-68II).

Measurement of Lightness L*

Table 2 illustrates lightness L*15, L*25, L*45, L*75, and L*110 in the L*a*b* color space calculated from spectral reflectance of light illuminated at an angle of 45 degrees with respect to the coating film and received at respective angles of 15 degrees, 25 degrees, 45 degrees, 75 degrees, and 110 degrees deviated from the specular reflection light. The measurement was performed with a multi-angle spectrophotometer (produced by X-Rite, Inc.; trade name MA-68II).

Calculation of X and Y

Figure 2:
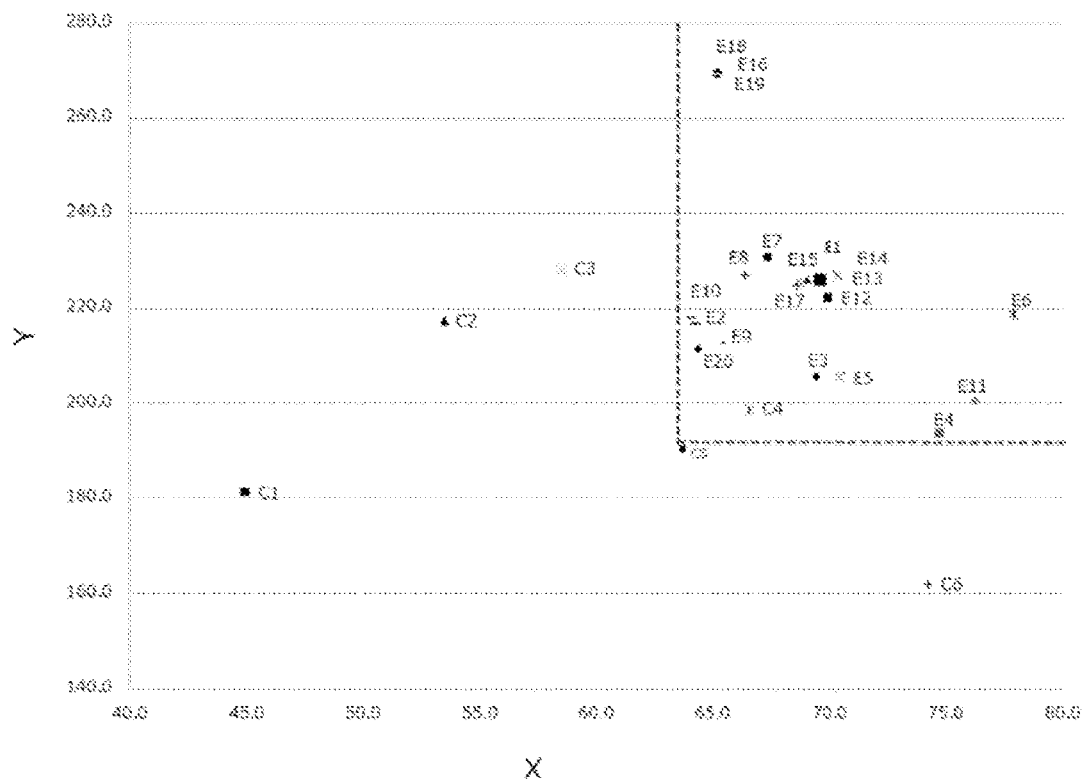
FIG. 2 illustrates X values and Y values of Examples 1 to 20, and Comparative Examples 1 to 6.

X and Y were determined in accordance with the following equations. FIG. 2 is a graph in which values of X and Y of Examples 1 to 20 and Comparative Examples 1 to 6 are plotted.

$$X = [(C^*45)^2 + (C^*75)^2]^{1/2},$$

$$Y = [(L^*15)^2 + (C^*15)^2]^{1/2} + [(L^*25)^2 + (C^*25)^2]^{1/2}$$

Measurement of Graininess (HG Value)

The HG value is an abbreviation of "Hi-light Graininess value." The HG value is one of the scales that indicate microscopic brilliance of a microscopically observed coating film, and is an index that indicates the graininess in the highlight. The HG value is calculated as follows. First, the surface of a coating film is photographed with a CCD camera at an incident angle of 15 degrees and a receiving angle of 0 degrees, and the obtained digital image data (two-dimensional luminance distribution data) is subjected to a two-dimensional Fourier transform to obtain a power spectrum image. Subsequently, from this power spectrum image, only the spatial frequency domain that corresponds to graininess is extracted; and the obtained measured parameter is converted to an HG value from 0 to 100 that has a linear relation with graininess. An HG value of "0" indicates no graininess in an effect pigment, and an HG value of "100" indicates the highest graininess of an effect pigment.

Measurement of Hue Angle h

Table 2 illustrates hue angle h in the L*C*h color space chromaticity calculated from spectral reflectance of light illuminated at an angle of 45 degrees with respect to a coating film, and received at an angle of 15 degrees deviated from the specular reflection light. Measurement was performed with a multi-angle spectrophotometer (produced by X-Rite, Inc.; trade name MA-68II).

TABLE 2

| | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 14 |
| Intermediate Paint (C) | C-1 | C-1 | C-1 | C-1 | C-1 | C-1 | C-1 | C-1 | C-1 | C-1 | C-1 | C-1 | C-1 |
| Base Paint (D) | D-1 | D-1 | D-1 | D-1 | D-1 | D-1 | D-1 | D-1 | D-1 | D-1 | D-1 | D-1 | D-1 |
| Metallic Base Paint (A) | A-1 | A-2 | A-3 | A-4 | A-5 | A-6 | A-7 | A-8 | A-9 | A-10 | A-11 | A-12 | A-1 |
| Clear Coat Paint (E) | Not Present | Not Present | Not Present | Not Present | Not Present | Not Present | Not Present | Not Present | Not Present | Not Present | Not Present | Not Present | Not Present |
| Transparent Colored Paint (B) | B-1 | B-1 | B-1 | B-1 | B-1 | B-1 | B-1 | B-1 | B-1 | B-1 | B-1 | B-1 | B-3 |
| Clear Coat Paint (E) | Not Present | Not Present | Not Present | Not Present | Not Present | Not Present | Not Present | Not Present | Not Present | Not Present | Not Present | Not Present | Not Present |
| Thickness of Dry Metallic Base Coating Film/μm | 2.3 | 1.7 | 1.8 | 1.8 | 0.9 | 1.5 | 2.4 | 2.4 | 0.8 | 1.1 | 2.6 | 2.4 | 2.4 |
| C*15 | 113.2 | 114.0 | 106.2 | 98.4 | 108.0 | 109.8 | 118.7 | 115.2 | 113.6 | 114.8 | 100.0 | 111.6 | 112.6 |
| C*25 | 92.9 | 84.9 | 82.2 | 79.4 | 80.6 | 89.8 | 91.9 | 91.9 | 81.3 | 83.5 | 34.1 | 92.6 | 92.7 |
| C*45 | 57.8 | 50.9 | 53.8 | 56.7 | 54.6 | 56.0 | 52.2 | 54.8 | 51.7 | 51.3 | 59.4 | 58.0 | 58.6 |
| C*75 | 38.8 | 3901 | 44.0 | 48.8 | 44.6 | 37.5 | 35.6 | 37.5 | 40.0 | 38.8 | 47.5 | 39.1 | 38.9 |
| C*110 | 33.7 | 35.5 | 40.2 | 44.9 | 39.8 | 32.7 | 31.9 | 33.7 | 35.6 | 34.7 | 42.9 | 33.9 | 33.6 |
| L*15 | 52.0 | 53.0 | 48.3 | 43.6 | 48.8 | 50.8 | 550 | 53.3 | 51.6 | 53.0 | 44.3 | 48.8 | 54.39 |
| L*25 | 40.4 | 36.2 | 34.5 | 32.8 | 33.0 | 32.0 | 39.5 | 39.8 | 33.3 | 34.7 | 35.3 | 38.6 | 42.48 |
| L*45 | 21.6 | 18.4 | 19.7 | 21.0 | 19.8 | 20.7 | 18.9 | 20.11 | 18.4 | 18.3 | 22.2 | 21.2 | 22.75 |
| L*75 | 12.1 | 12.5 | 14.7 | 16.9 | 14.6 | 11.6 | 10.6 | 11.5 | 12.5 | 12.0 | 16.1 | 12.1 | 12.48 |
| L*110 | 10.2 | 11.2 | 13.2 | 15.3 | 12.8 | 9.8 | 9.3 | 9.9 | 10.9 | 10.6 | 14.2 | 10.1 | 10.31 |
| X Value | 69.6 | 64.1 | 69.4 | 74.8 | 70.5 | 67.4 | 63.2 | 66.4 | 65.4 | 64.3 | 76.2 | 69.9 | 70.34 |
| Y Value | 225.9 | 218.0 | 205.8 | 193.5 | 205.6 | 218.9 | 230.7 | 227.1 | 212.6 | 216.8 | 200.5 | 222.1 | 227 |
| HG Value | 38 | 41 | 34 | 28 | 17 | 17 | 45 | 42 | 18 | 20 | 28 | 37 | 39 |
| Hue Angle h | 33 | 32 | 33 | 33 | 33 | 33 | 32 | 33 | 33 | 33 | 34 | 34 | 33 |

TABLE 2-continued

|  | Examples | | | | | | Comparative Examples | | | | | |
| --- | --- | --- | --- | --- | --- | --- | --- | --- | --- | --- | --- | --- |
|  | 15 | 16 | 17 | 18 | 19 | 20 | 1 | 2 | 3 | 4 | 5 | 6 |
| Intermediate Paint (C) | C-1 | C-1 | C-1 | C-1 | C-1 | C-1 | C-1 | C-1 | C-1 | C-1 | C-1 | C-1 |
| Base Paint (D) | D-1 | D-1 | D-1 | Not Present | Not Present | D-1 | D-1 | D-1 | D-1 | Not Present | Not Present | D-1 |
| Metallic Base Paint (A) | A-1 | A-1 | A-1 | A-1 | A-1 | A-1 | A-13 | A-14 | A-15 | A-16 | A-17 | A-17 |
| Clear Coat Paint (E) | Not Present | E-1 | Not Present | E-1 | Not Present | Not Present | Not Present | Not Present | Not Present | Not Present | Not Present | Not Present |
| Transparent Colored Paint (B) | B-4 | B-5 | B-1 | B-5 | B-1 | B-1 | B-1 | B-1 | B-1 | B-1 | Not Present | B-1 |
| Clear Coat Paint (E) | Not Present | E-1 | E-1 | E-1 | Not Present | E-1 | Not Present | Not Present | Not Present | E-1 | E-1 |  |
| Thickness of Dry Metallic Base Coating Film/μm | 2.4 | 2.3 | 2.3 | 2.3 | 2.3 | 2.3 | 0.8 | 2.1 | 0.9 | 15.0 | 30.0 | 30.0 |
| C*15 | 109.1 | 141.5 | 112.2 | 141.5 | 113.2 | 112.2 | 102.9 | 119.5 | 121.1 | 101.7 | 93.0 | 79.5 |
| C*25 | 89.5 | 101.0 | 91.9 | 101.0 | 92.9 | 91.9 | 65.1 | 79.5 | 87 | 80.07 | 78.4 | 70.4 |
| C*45 | 57 | 52.5 | 56.8 | 52.5 | 57.8 | 56.8 | 35.4 | 43.9 | 48.5 | 52.6 | 52.2 | 55.5 |
| C*75 | 38.5 | 38.6 | 37.8 | 38.6 | 38.8 | 37.8 | 26.4 | 30.5 | 32.8 | 40.8 | 36.6 | 49.1 |
| C*110 | 33.3 | 37.0 | 32.7 | 37.0 | 33.7 | 32.7 | 23 | 27.3 | 29.2 | 36.1 | 31.8 | 56.1 |
| L*15 | 56.66 | 70.4 | 51.0 | 70.4 | 52.0 | 51.0 | 43.34 | 55.05 | 56.69 | 45.27 | 48.8 | 32.99 |
| L*25 | 46.57 | 46.5 | 39.4 | 46.5 | 40.4 | 39.4 | 24.48 | 32.41 | 37.08 | 33.93 | 36.6 | 28.54 |
| L*45 | 24.67 | 20.2 | 20.6 | 20.2 | 21.6 | 20.6 | 11.32 | 14.84 | 17.08 | 20.11 | 21.3 | 21.61 |
| L*75 | 13.21 | 13.4 | 11.1 | 13.4 | 12.1 | 11.1 | 6.85 | 8.37 | 9.41 | 14.46 | 13.6 | 18.31 |
| L*110 | 10.71 | 12.8 | 9.2 | 12.8 | 10.2 | 9.2 | 6.11 | 7.39 | 8.26 | 12.74 | 11.8 | 17.2 |
| X Value | 68.78 | 65.2 | 68.2 | 65.2 | 69.6 | 68.2 | 44.97 | 53.46 | 58.55 | 66.57 | 63.75 | 74.25 |
| Y Value | 225.2 | 269.2 | 223.2 | 269.2 | 225.9 | 223.2 | 181.2 | 217.4 | 228.3 | 198.9 | 190.4 | 162 |
| HG Value | 41 | 38 | 37 | 38 | 38 | 37 | 35 | 39 | 26 | 55 | 65 | 42 |
| Hue Angle h | 31 | 33 | 33 | 33 | 33 | 33 | 27 | 30 | 32 | 33 | 34 | 36 |

The invention claimed is:

1. A laminate comprising a metallic base layer and a transparent colored layer formed on the metallic base layer, wherein, the metallic base layer has a film thickness of 0.02 to 5 μm; and
when $$X=[(C^{*}45)^{2}+(C^{*}75)^{2}]^{1/2}, \text{ and}$$

$$Y=[(L^{*}15)^{2}+(C^{*}15)^{2}]^{1/2}+[(L^{*}25)^{2}+(C^{*}25)^{2}]^{1/2},$$

X is 64 or more, and Y is 191 or more; and
the measured value of graininess (HG value) is 45 or less, with the proviso that C*15, C*25, C* 45, and C* 75 represent chroma calculated from spectral reflectances of light illuminated at an incident angle of 45 degrees with respect to the laminate and received at respective angles of 15 degrees, 25 degrees, 45 degrees, and 75 degrees deviated from the specular reflection light, and that L*15 and L*25 represent lightness calculated from spectral reflectances of light illuminated at an incident angle of 45 degrees with respect to die laminate and received at respective angles of 15 degrees and 25 degrees deviated from the specular reflection light.

2. The laminate according to claim 1, wherein X is 65 or more and 80 or less, and Y is 200 or more and 240 or less.

3. The laminate according to claim 1, wherein the metallic base layer comprises an aluminum pigment in an amount of 15 to 70 parts by mass, on a solids basis, based on 100 parts by mass of the metallic base layer.

4. The laminate according to claim 1, further comprising a clear coat layer on the transparent colored layer.

5. An object comprising the laminate according to claim 1.

* * * * *